US012785310B2

(12) United States Patent
Hashiguchi

(10) Patent No.: US 12,785,310 B2
(45) Date of Patent: Nov. 3, 2026

(54) CONNECTOR CONFIGURED TO BE CONNECTED TO A SHEET SHAPE CONNECTION OBJECT HAVING A FLEXIBLE CONDUCTOR EXPOSED ON AT LEAST ONE SURFACE THEREOF

(71) Applicant: Japan Aviation Electronics Industry, Limited, Tokyo (JP)

(72) Inventor: Osamu Hashiguchi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 395 days.

(21) Appl. No.: 18/520,744

(22) Filed: Nov. 28, 2023

(65) Prior Publication Data

US 2024/0222893 A1 Jul. 4, 2024

(30) Foreign Application Priority Data

Dec. 28, 2022 (JP) ................................ 2022-211261

(51) Int. Cl.
*H01R 12/77* (2011.01)
*H01R 13/05* (2006.01)
*H01R 13/424* (2006.01)
*H01R 43/20* (2006.01)

(52) U.S. Cl.
CPC ........... *H01R 12/777* (2013.01); *H01R 13/05* (2013.01); *H01R 13/424* (2013.01); *H01R 43/20* (2013.01)

(58) Field of Classification Search
CPC .... H01R 12/777; H01R 13/05; H01R 13/424; H01R 43/20; H01R 12/69; H01R 12/592; H01R 13/04; H01R 13/02; H01R 13/2414; H01R 13/631; H01R 43/26; H01R 2201/12; H01R 2201/20; A41D 1/005; A41D 27/00; A41D 1/002
See application file for complete search history.

(56) References Cited

U.S. PATENT DOCUMENTS

| | | | | |
|---|---|---|---|---|
| 10,868,380 | B1 * | 12/2020 | Komoto ............... | H01R 12/771 |
| 11,024,993 | B2 * | 6/2021 | Nakamura ........... | H01R 12/616 |
| 12,456,830 | B2 * | 10/2025 | Matsuo ................ | H01R 12/774 |
| 12,542,391 | B2 * | 2/2026 | Nakamura ........... | H01R 13/422 |
| 2018/0233854 | A1 | 8/2018 | Komoto et al. | |
| 2021/0104824 | A1 | 4/2021 | Hashiguchi et al. | |

FOREIGN PATENT DOCUMENTS

| | | |
|---|---|---|
| JP | 2018129244 A | 8/2018 |

* cited by examiner

*Primary Examiner* — Edwin A. Leon
(74) *Attorney, Agent, or Firm* — Muncy, Geissler, Olds & Lowe, P.C.

(57) ABSTRACT

A connector includes a conductive plug contact including a recessed portion, a conductive inner contact inserted in the recessed portion, and a bottom insulator including a projection inserted in the recessed portion, the inner contact including a contact portion that is elastically displaceable in an orthogonal direction perpendicular to the fitting axis and makes contact with the plug contact in the recessed portion, a projection contacting portion that is elastically displaceable in the orthogonal direction and makes contact with a lateral surface of the projection in the recessed portion, and a pressing portion that is elastically displaceable in the orthogonal direction and faces an inner surface of the recessed portion, a part of a sheet type connection object being sandwiched between the pressing portion and the inner surface of the recessed portion in the orthogonal direction.

13 Claims, 17 Drawing Sheets

CONNECTOR CONFIGURED TO BE CONNECTED TO A SHEET SHAPE CONNECTION OBJECT HAVING A FLEXIBLE CONDUCTOR EXPOSED ON AT LEAST ONE SURFACE THEREOF

BACKGROUND OF THE INVENTION

The present invention relates to a connector and a connecting method, particularly to a connector connected to a sheet type connection object having a flexible conductor exposed on at least one surface of the connection object.

In recent years, attention has been drawn to so-called smart clothes that can obtain user's biological data such as the heart rate and the body temperature only by being worn by the user. Such smart clothes have an electrode disposed at a measurement site, and when a wearable device serving as a measurement device is electrically connected to the electrode, biological data can be transmitted to the wearable device.

The electrode and the wearable device can be interconnected by, for instance, use of a connector connected to a flexible conductor drawn from the electrode.

As a connector of this type, for example, JP 2018-129244 A discloses a connector as illustrated in FIG. 33. The connector includes a housing 2 and a base member 3 that are disposed on the opposite sides of a flexible substrate 1 to sandwich the flexible substrate 1 therebetween. Tubular portions 4A of contacts 4 are passed through contact through-holes 2A of the housing 2, and flanges 4B of the contacts 4 are sandwiched between the housing 2 and flexible conductors 1A exposed on the top surface of the flexible substrate 1.

In this state, when the base member 3 is pushed toward the housing 2, as shown in FIG. 34, a projection 3A of the base member 3 is inserted into a projection accommodating portion 4C of the contact 4 with the flexible substrate 1 being sandwiched therebetween, and the inner surface of the projection accommodating portion 4C makes contact with the flexible conductor 1A with a predetermined contact force, whereby the contact 4 is electrically connected to the flexible conductor 1A.

Further, housing fixing posts 3B formed to project from the base member 3 are press-fitted into post accommodating portions 2B of the housing 2 as shown in FIG. 33, so that the housing 2 and the base member 3 are fixed to each other.

When fitted to the connector disclosed in JP 2018-129244 A, a wearable device can be connected to electrodes constituted of the flexible conductors.

However, when a flexible conductor 1B is exposed on the bottom surface of the flexible substrate 1, the connector of JP 2018-129244 A would be useless in electrically connecting the flexible conductor 1B to the contact 4.

SUMMARY OF THE INVENTION

The present invention has been made to solve the foregoing problem and aims at providing a connector that can electrically connecting a contact to a flexible conductor of a connection object regardless of whether the flexible conductor is exposed on the top surface or the bottom surface of the connection object.

A connector according to the present invention comprises:

a plug contact having a conductive property and including a recessed portion extending along a fitting axis;

an inner contact having a conductive property and inserted in the recessed portion; and a bottom insulator including a projection extending along the fitting axis and inserted in the recessed portion, wherein the inner contact includes

- a contact portion that is elastically displaceable in a direction perpendicular to the fitting axis and makes contact with the plug contact in the recessed portion,
- a projection contacting portion that is elastically displaceable in a direction perpendicular to the fitting axis and makes contact with a lateral surface of the projection in the recessed portion, and
- a pressing portion that is elastically displaceable in a direction perpendicular to the fitting axis and faces an inner surface of the recessed portion, and a part of a connection object of sheet type having a flexible conductor exposed on at least one surface of the connection object is sandwiched between the pressing portion and the inner surface of the recessed portion in a direction perpendicular to the fitting axis, the inner surface of the recessed portion makes contact with a top surface of the connection object, and the pressing portion makes contact with a bottom surface of the connection object, whereby the plug contact is electrically connected to the flexible conductor directly when the flexible conductor is exposed on the top surface of the connection object, and the plug contact is electrically connected to the flexible conductor via the inner contact when the flexible conductor is exposed on the bottom surface of the connection object.

A connecting method according to the present invention is a method for connecting the plug contact to the flexible conductor of the connection object by use of the connector according to claim 1, the method comprising:

disposing the connection object with respect to the plug contact such that the flexible conductor exposed on at least one surface of the connection object is positioned at an opening end portion of the recessed portion of the plug contact;

inserting the inner contact into the recessed portion while pushing the connection object into the recessed portion such that the contact portion of the inner contact makes contact with the plug contact within the recessed portion and that the connection object is sandwiched between the pressing portion of the inner contact and the inner surface of the recessed portion in a direction perpendicular to the fitting axis; and inserting the projection of the bottom insulator into the recessed portion such that the lateral surface of the projection makes contact with the projection contacting portion of the inner contact, whereupon the inner surface of the recessed portion makes contact with the top surface of the connection object, and the pressing portion makes contact with the bottom surface of the connection object, whereby the plug contact is electrically connected to the flexible conductor directly when the flexible conductor is exposed on the top surface of the connection object, and the plug contact is electrically connected to the flexible conductor via the inner contact when the flexible conductor is exposed on the bottom surface of the connection object.

DETAILED DESCRIPTION OF THE INVENTION

Embodiments of the present invention are described below based on the accompanying drawings.

Embodiment 1

Figure 1:
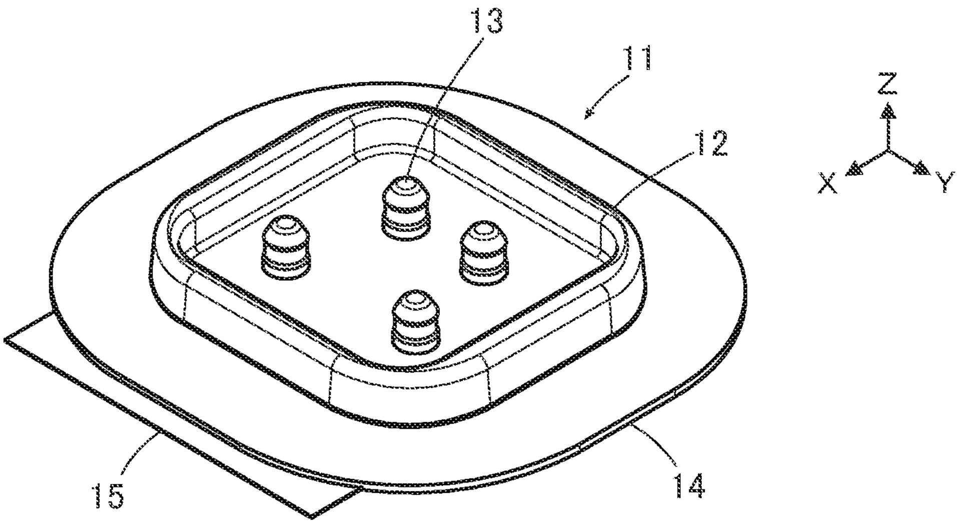
FIG. 1 is a perspective view showing a connector according to Embodiment 1.

FIG. 1 shows a connector 11 according to Embodiment 1. The connector 11 is used as, for instance, a garment-side connector for fitting a wearable device and includes a housing 12 made of an insulating material. Four plug contacts 13 are retained in the housing 12, and a reinforcement sheet 14 and a sheet type conductive member 15 being superposed on each other are retained by the housing 12. The sheet type conductive member 15 constitutes a connection object to which the connector 11 is connected.

The four plug contacts 13 are aligned in two rows parallel to each other and disposed to project perpendicularly to the sheet type conductive member 15.

For convenience, the reinforcement sheet 14 and the sheet type conductive member 15 are defined as extending in an XY plane, the alignment direction of the four plug contacts 13 is referred to as "Y direction," and the direction in which the four plug contacts 13 project is referred to as "+Z direction." The Z direction is a fitting direction in which the connector 11 is fitted to a counter connector.

Figure 2:
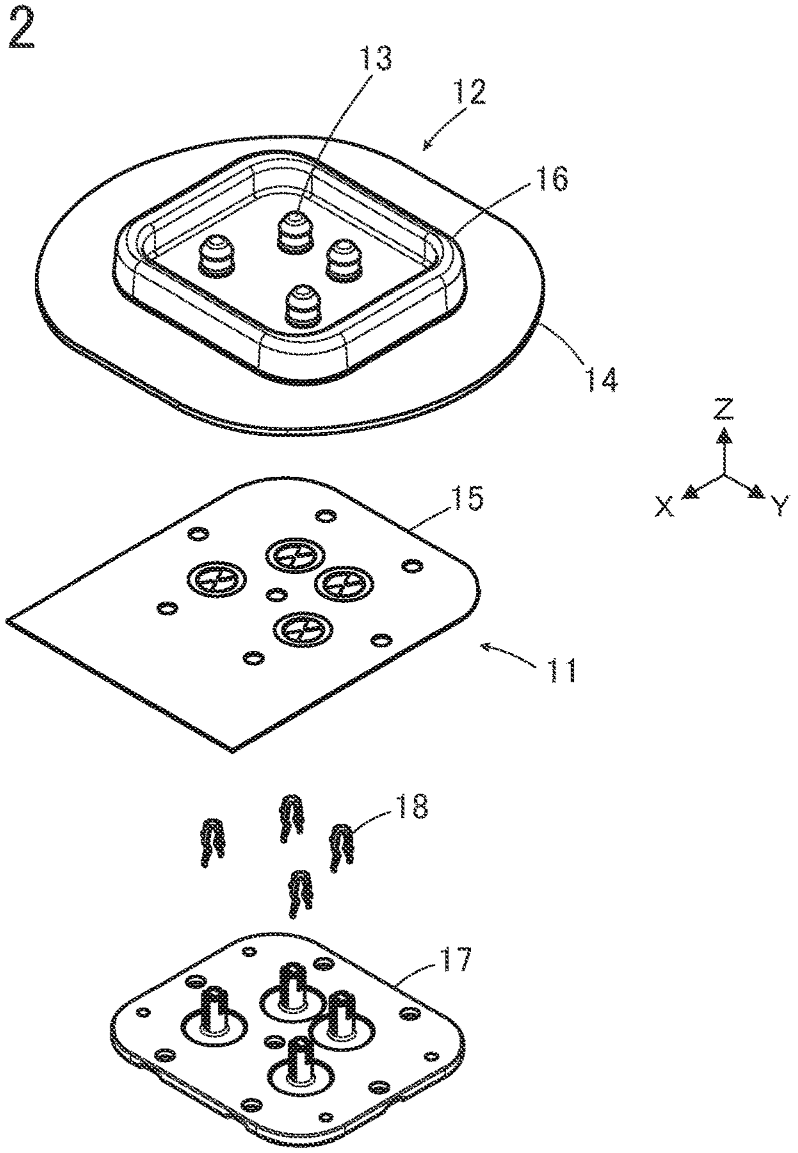
FIG. 2 is an assembly view of the connector according to Embodiment 1.

FIG. 2 shows an assembly view of the connector 11. The connector 11 includes a top insulator 16 and a bottom insulator 17, and these top and bottom insulators 16 and 17 constitute the housing 12.

The four plug contacts 13 are retained in the top insulator 16. The reinforcement sheet 14 is disposed on the bottom surface of the top insulator 16 on the −Z direction side, and the sheet type conductive member 15 is disposed on the −Z direction side of the reinforcement sheet 14. Further, four inner contacts 18 are disposed on the −Z direction side of the sheet type conductive member 15, and the bottom insulator 17 is disposed on the −Z direction side of the inner contacts 18. The four inner contacts 18 separately correspond to the four plug contacts 13.

Figure 3:
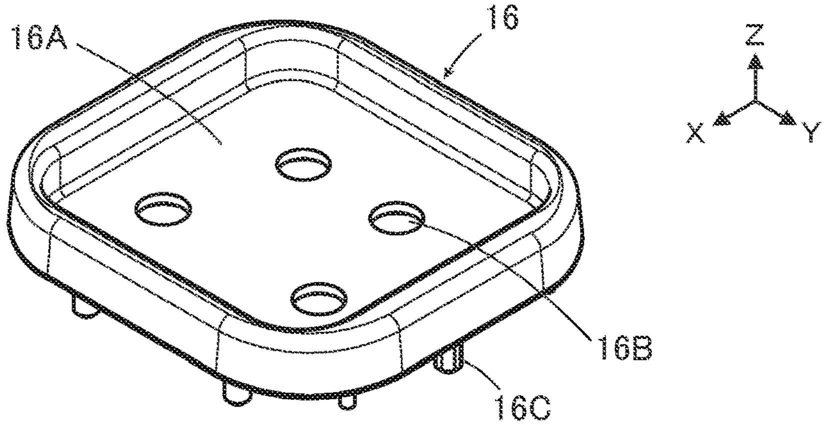
FIG. 3 is a perspective view showing a top insulator used in the connector of Embodiment 1.

As shown in FIG. 3, the top insulator 16 includes a recessed portion 16A opening in the +Z direction and four contact through-holes 16B formed within the recessed portion 16A. The recessed portion 16A constitutes a counter connector accommodating portion in which a part of a counter connector (not shown) is to be accommodated, and the four contact through-holes 16B correspond to the four plug contacts 13. A plurality of bosses 16C projecting in the −Z direction are formed on a surface, facing the −Z direction, of the top insulator 16.

The four plug contacts 13 are made of a conductive material such as metal and are to be connected to corresponding contacts of a counter connector (not shown) when a part of the counter connector is accommodated in the recessed portion 16A of the top insulator 16.

Figure 4:
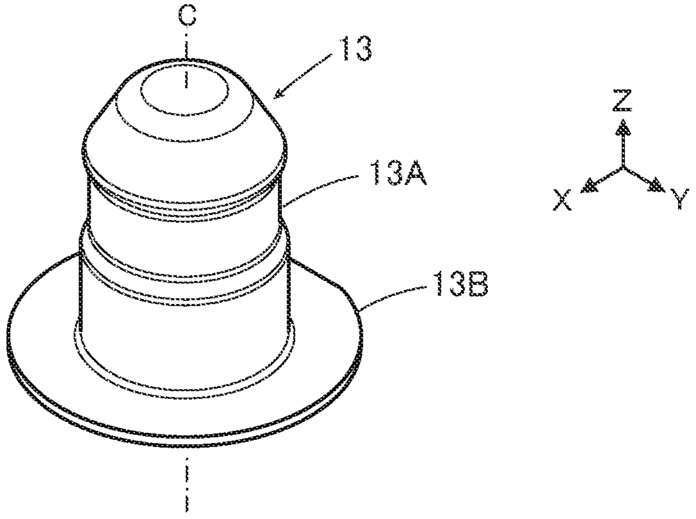
FIG. 4 is a perspective view showing a plug contact used in the connector of Embodiment 1.

As shown in FIG. 4, the plug contact 13 includes a protrusion portion protruding in the +Z direction along a fitting axis C, specifically, a tubular portion 13A in the shape of a cylindrical tube, and a flange 13B in a discoid shape extending in a radial direction along an XY plane from the −Z directional base end of the tubular portion 13A.

Figure 5:
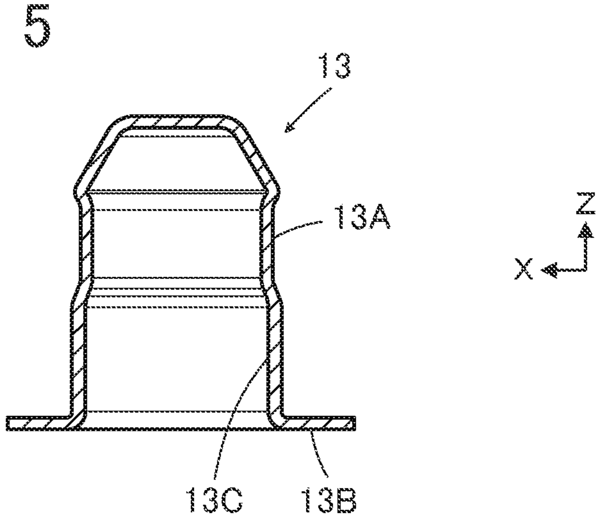
FIG. 5 is a cross-sectional view showing the plug contact used in the connector of Embodiment 1.

As shown in FIG. 5, the interior of the tubular portion 13A forms a recessed portion 13C opening in the −Z direction.

The fitting axis C is an axis passing through the center of the tubular portion 13A and extending in the direction in which the connector 11 and a counter connector are fitted to each other.

While the tubular portion 13A has the shape of a cylindrical tube, the cross section thereof is not limited to a circle and may be any of various shapes such as an ellipse and a polygon as long as the tubular portion 13A has the recessed portion 13C in its interior.

The four plug contacts 13 can be each used as a terminal for transmitting electric signals.

Figure 6:
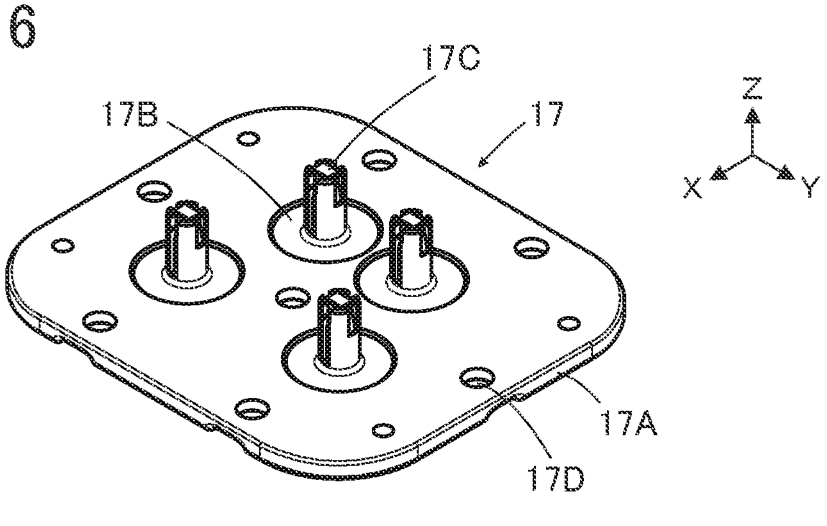
FIG. 6 is a perspective view showing a bottom insulator used in the connector of Embodiment 1.

As shown in FIG. 6, the bottom insulator 17 includes a flat plate portion 17A, and the flat plate portion 17A is provided with four circular recessed portions 17B opening in the +Z direction. The four recessed portions 17B correspond to the four plug contacts 13. The four recessed portions 17B are provided separately with four projections 17C projecting in the +Z direction from central parts of the respective recessed portions 17B.

Further, the flat plate portion 17A is provided with a plurality of through-holes 17D corresponding to the bosses 16C of the top insulator 16.

Figure 7:
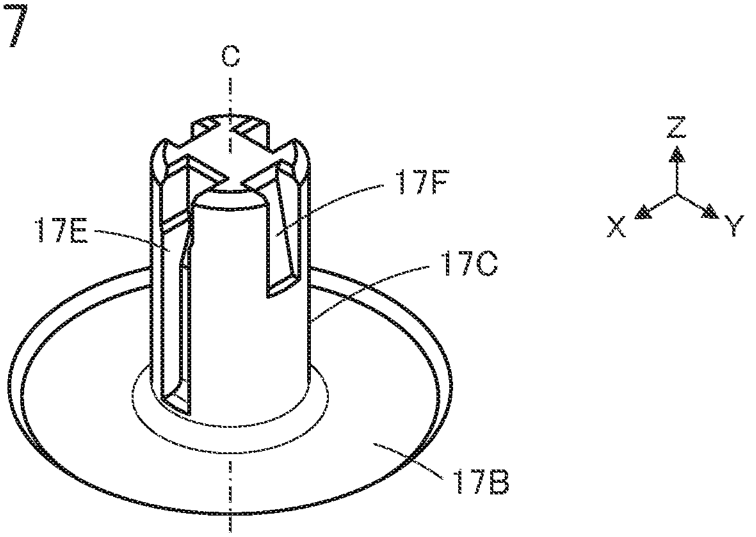
FIG. 7 is a perspective view showing a projection of the bottom insulator used in the connector of Embodiment 1.

As shown in FIG. 7, the projection 17C formed in the recessed portion 17B of the bottom insulator 17 has the shape of a circular column extending in the Z direction along the fitting axis C of the plug contact 13 situated to correspond to the recessed portion 17B. First arm insertion grooves 17E extending in the Z direction are formed at the lateral surface of the projection 17C separately on the opposite sides in the X direction, and second arm insertion grooves 17F extending in the Z direction are formed at the lateral surface of the projection 17C separately on the opposite sides in the Y direction.

In other words, of the lateral surface of the projection 17C of circular columnar shape, a part facing the +X direction and a part facing the −X direction are each provided with the first arm insertion groove 17E, and a part facing the +Y direction and a part facing the −Y direction are each provided with the second arm insertion groove 17F.

Figure 8:
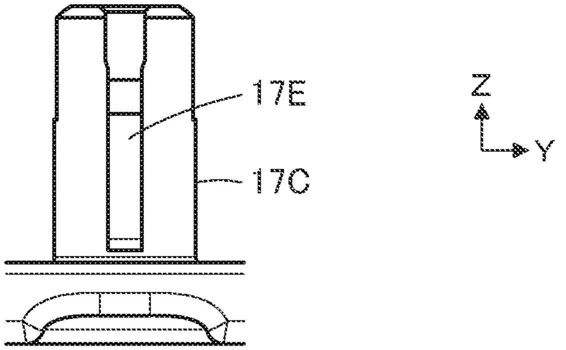
FIG. 8 is a side view of the projection of the bottom insulator used in the connector of Embodiment 1, as viewed from a first direction.
Figure 9:
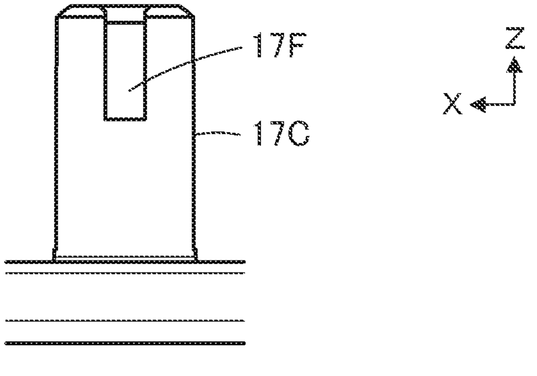
FIG. 9 is a side view of the projection of the bottom insulator used in the connector of Embodiment 1, as viewed from a second direction.

As shown in FIG. 8, the first arm insertion groove 17E extends over the entire Z directional height of the projection 17C from the +Z directional end of the projection 17C to the −Z directional end thereof, and as shown in FIG. 9, the second arm insertion groove 17F extends from the +Z directional end of the projection 17C to an intermediate portion thereof in the Z direction.

Figure 10:
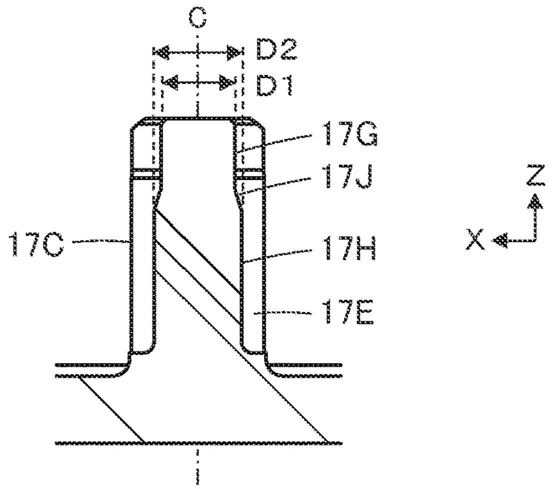
FIG. 10 is a cross-sectional side view of the projection of the bottom insulator used in the connector of Embodiment 1, as viewed from the second direction.

As shown in FIG. 10, each first arm insertion groove 17E includes: a first bottom surface 17G extending along a YZ plane in a portion on the +Z direction side; a second bottom surface 17H extending along a YZ plane in a portion on the −Z direction side and situated away from the fitting axis C in the X direction compared to the first bottom surface 17G; and an inclined bottom surface 17J connecting the first bottom surface 17G and the second bottom surface 17H and inclined with respect to the fitting axis C.

In an XZ plane passing the pair of first arm insertion grooves 17E, the projection 17C has a thickness D1 in the X direction at a Z directional position where the first bottom surface 17G is formed and, at a Z directional position where the second bottom surface 17H is formed, a thickness D2 in the X direction that is larger than the thickness D1 at the Z directional position of the first bottom surface 17G.

The sheet type conductive member 15 has a multilayer structure in which a plurality of wiring layers each formed of a flexible conductor and a plurality of insulating layers are laminated.

Figure 11:
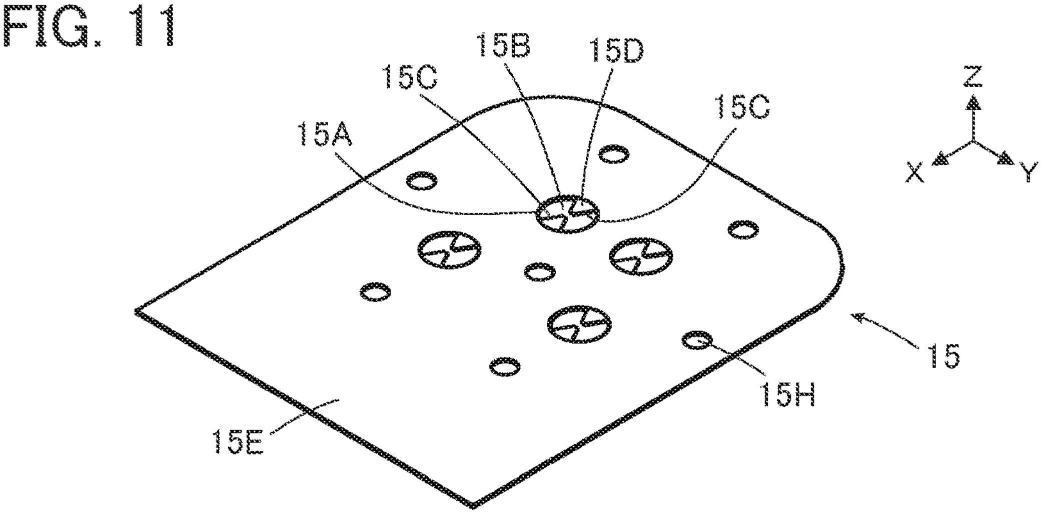
FIG. 11 is a perspective view of a connection object to be connected to the connector of Embodiment 1, as viewed from an obliquely upper position.

As shown in FIG. 11, four contact arrangement regions 15A used to arrange the four plug contacts 13 are defined on the top surface, facing the +Z direction, of the sheet type conductive member 15. Each of the four contact arrangement regions 15A is provided with an opening 15B penetrating the sheet type conductive member 15 and further with a pair of substantially triangular protruding portions 15C protruding inward within the opening 15B separately from the +X directional edge and the −X directional edge of the contact arrangement region 15A. A wiring layer 15D is exposed on the protruding portions 15C protruding inward within the four openings 15B, while an insulating layer 15E is exposed in the other region than the four openings 15B.

On the bottom surface, facing the −Z direction, of the sheet type conductive member 15, a wiring layer 15F is exposed on the protruding portions 15C protruding inward within the four openings 15B, while an insulating layer 15G is exposed in the other region than the four openings 15B.

Figure 12:
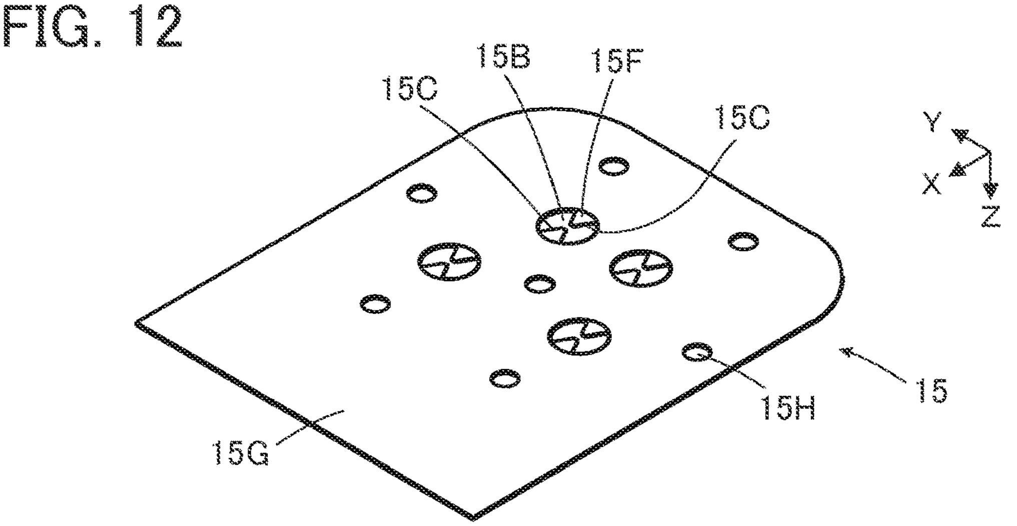
FIG. 12 is a perspective view of the connection object to be connected to the connector of Embodiment 1, as viewed from an obliquely lower position.

Further, the sheet type conductive member 15 is provided in its peripheral portion with a plurality of through-holes 15H corresponding to the bosses 16C of the top insulator 16 as shown in FIGS. 11 and 12.

Figure 13:
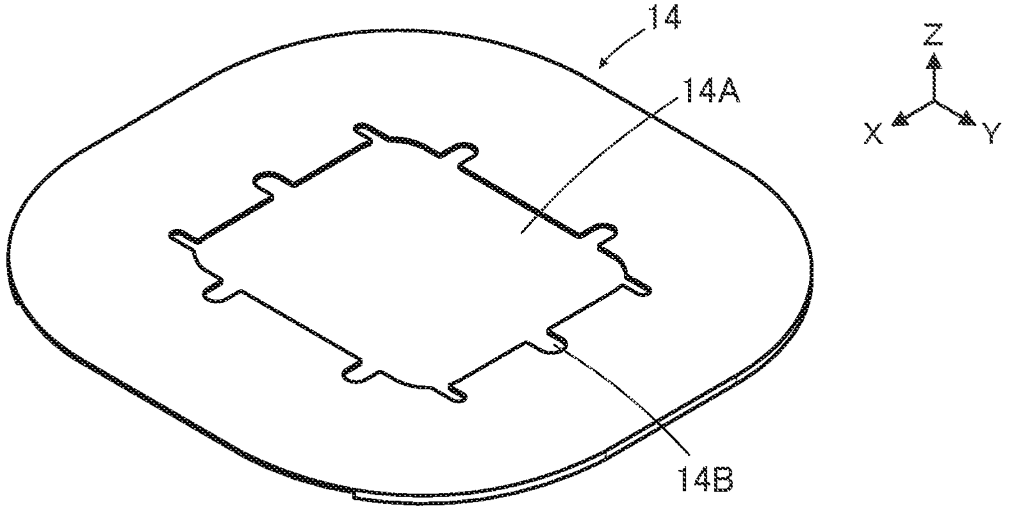
FIG. 13 is a perspective view showing a reinforcement sheet used in the connector of Embodiment 1.

As shown in FIG. 13, the reinforcement sheet 14 is used to reinforce a mounting object (not shown) such as a garment on which the connector 11 is to be mounted. The reinforcement sheet 14 is made of an insulating material and provided at its center with an opening 14A. Further, a plurality of notches 14B corresponding to the bosses 16C of the top insulator 16 are formed along the periphery of the opening 14A of the reinforcement sheet 14.

Figure 14:
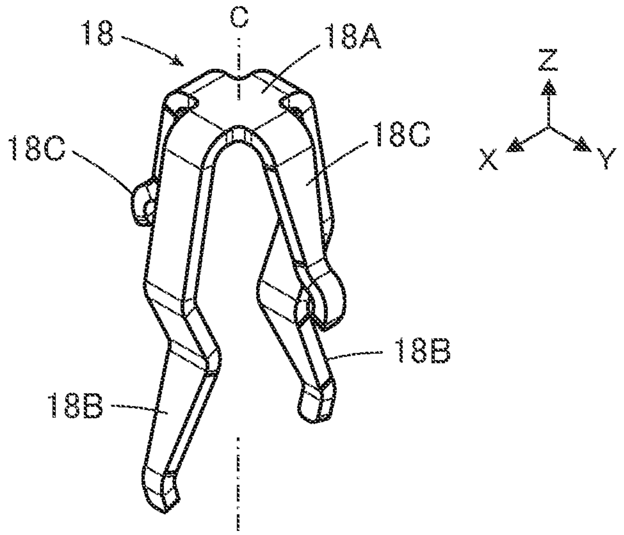
FIG. 14 is a perspective view showing an inner contact used in the connector of Embodiment 1.

FIG. 14 shows the structure of an inner contact 18. The inner contact 18 is formed of a plate member made of a conductive material such as metal and bent, and includes a base portion 18A situated on the fitting axis C and extending in an XY plane, a pair of first arm portions 18B extending in at least the −Z direction separately from the +X directional end and the −X directional end of the base portion 18A, and a pair of second arm portions 18C extending in at least the −Z direction separately from the +Y directional end and the −Y directional end of the base portion 18A. It should be noted that the X direction forms a first direction perpendicular to the fitting axis C and the Y direction forms a second direction perpendicular to the fitting axis C and also perpendicular to the first direction.

Figure 15:
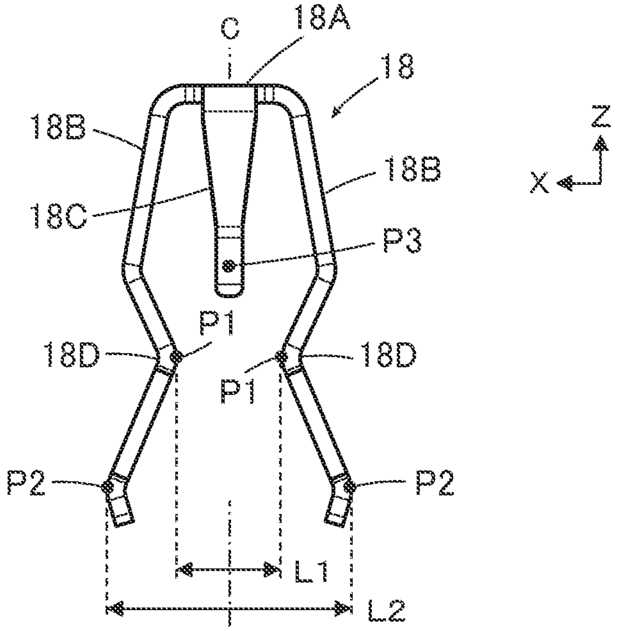
FIG. 15 is a side view of the inner contact used in the connector of Embodiment 1, as viewed from the second direction.

As shown in FIG. 15, the pair of first arm portions 18B face each other in the X direction and have a symmetrical shape with respect to a YZ plane passing the fitting axis C.

The pair of first arm portions 18B have, in their intermediate portions in the Z direction, a pair of first bending portions 18D bent to approach each other and each form a projecting shape, and projecting surfaces of the pair of first bending portions 18D that face each other form a pair of projection contacting portions P1 that are elastically displaceable in the X direction perpendicular to the fitting axis C.

The pair of first arm portions 18B also have, in their −Z directional tip portions, a pair of projecting surfaces facing the opposite directions from each other in the X direction, and this pair of projecting surfaces form a pair of pressing portions P2 that are elastically displaceable in the X direction perpendicular to the fitting axis C.

With no external force acting on the inner contact 18, a distance L1 between the pair of projection contacting portions P1 in the X direction has a dimension substantially equal to the thickness D1 of the projection 17C of the bottom insulator 17 shown in FIG. 10 and smaller than the thickness D2 thereof, and a distance L2 between the pair of pressing portions P2 in the X direction has a dimension substantially equal to or slightly smaller than a value obtained by subtracting a double of the thickness of the sheet type conductive member 15 from the inner diameter of the recessed portion 13C of the plug contact 13.

Figure 16:
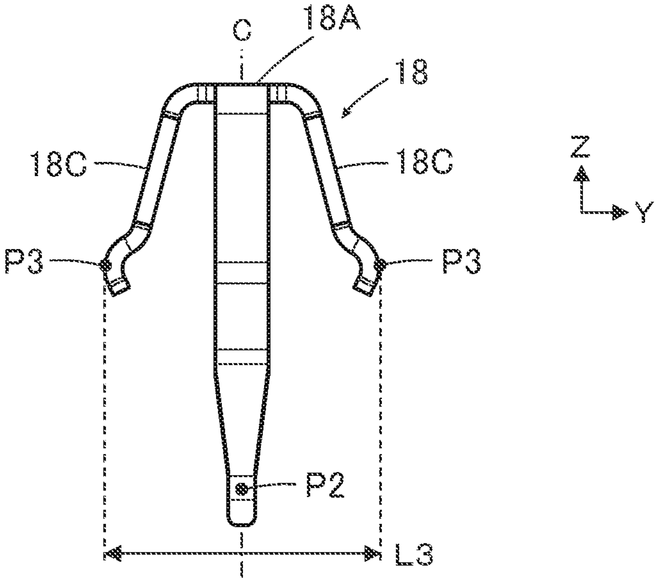
FIG. 16 is a side view of the inner contact used in the connector of Embodiment 1, as viewed from the first direction.

As shown in FIG. 16, the pair of second arm portions 18C slantingly extend from the +Y and −Y directional ends of the base portion 18A such that a gap therebetween in the Y direction gradually widens toward the −Z direction, face each other in the Y direction, and have a symmetrical shape with respect to an XZ plane passing the fitting axis C.

The −Z directional tip portions of the pair of second arm portions 18C have a pair of projecting surfaces facing the opposite directions from each other in the Y direction, and this pair of projecting surfaces form a pair of contact portions P3 that are elastically displaceable in the Y direction perpendicular to the fitting axis C.

With no external force acting on the inner contact 18, a distance L3 between the pair of contact portions P3 in the Y direction has a dimension larger than the inner diameter of the recessed portion 13C of the plug contact 13.

Figure 17:
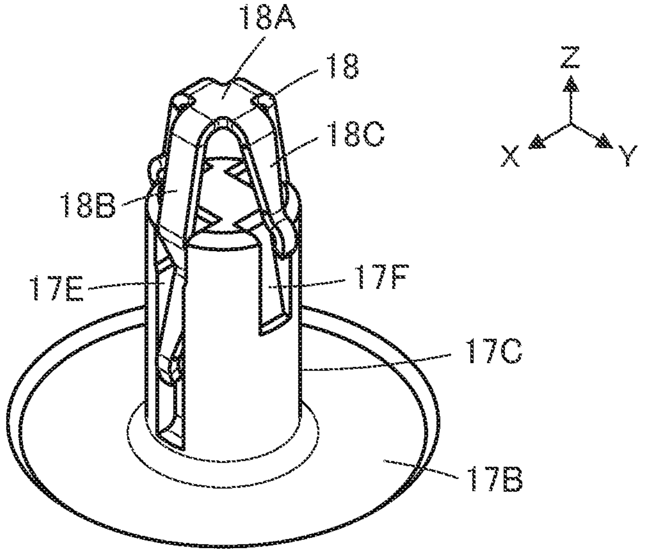
FIG. 17 is a perspective view showing the inner contact retained on the projection of the bottom insulator in Embodiment 1.

When the connector 11 is assembled, first, each inner contact 18 is temporarily retained on the corresponding projection 17C of the bottom insulator 17 as shown in FIG. 17. The inner contact 18 is temporarily retained on the projection 17C with the pair of first arm portions 18B being inserted in the pair of first arm insertion grooves 17E of the projection 17C and the pair of projection contacting portions P1 being in contact with the first bottom surfaces 17G of the first arm insertion grooves 17E shown in FIG. 10.

In the state where the inner contact 18 is temporarily retained on the projection 17C, the pair of second arm portions 18C of the inner contact 18 are not yet inserted in the pair of second arm insertion grooves 17F of the projection 17C.

Next, the bosses 16C of the top insulator 16 are inserted into the notches 14B of the reinforcement sheet 14. At this time, the four contact through-holes 16B of the top insulator 16 are situated inside the opening 14A of the reinforcement sheet 14.

Further, the tubular portions 13A of the plug contacts 13 are correspondingly inserted into the four contact through-holes 16B of the top insulator 16 from the −Z direction, and the sheet type conductive member 15 is disposed on the −Z direction side of the four plug contacts 13 such that each opening 15B and each pair of protruding portions 15C of the sheet type conductive member 15 are positioned at an opening end portion of the recessed portion 13C of the corresponding tubular portion 13A.

Figure 18:
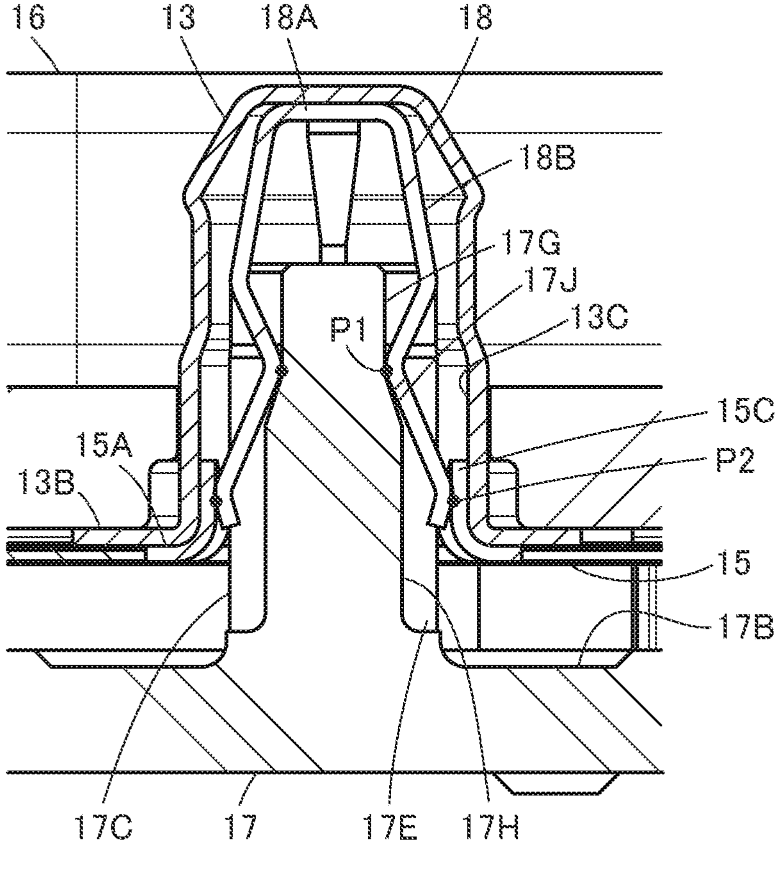
FIG. 18 is a partial cross-sectional side view showing the state of the interior of the plug contact in the connector of Embodiment 1 during the assembling operation, as viewed from the second direction.

In this state, the bottom insulator 17 is pushed toward the top insulator 16 in the +Z direction with the sheet type conductive member 15 being sandwiched therebetween. At this time, as shown in FIG. 18, the flange 13B of each plug contact 13 is situated above the corresponding contact arrangement region 15A of the sheet type conductive member 15, and each inner contact 18 temporarily retained on the bottom insulator 17 is inserted into the recessed portion 13C of the corresponding plug contact 13 while pushing the corresponding pair of protruding portions 15C of the sheet type conductive member 15.

Consequently, the pair of protruding portions 15C of the sheet type conductive member 15 pushed into the recessed portion 13C of the plug contact 13 are sandwiched between the pair of pressing portions P2 formed at the −Z directional end portions of the pair of first arm portions 18B of the inner contact 18 and the inner surface of the recessed portion 13C of the plug contact 13.

Meanwhile, with no external force acting on the inner contact 18, the pair of pressing portions P2 have the distance L2 in the X direction that is substantially equal to or slightly smaller than a value obtained by subtracting a double of the thickness of the sheet type conductive member 15 from the inner diameter of the recessed portion 13C of the plug contact 13 as shown in FIG. 15; therefore, the pair of protruding portions 15C of the sheet type conductive member 15 are smoothly inserted into the recessed portion 13C of the plug contact 13 without being subjected to a large force from the inner contact 18 and being rubbed.

The pair of projection contacting portions P1 of the inner contact 18 are in contact with the first bottom surfaces 17G of the pair of first arm insertion grooves 17E of the projection 17C, and when the bottom insulator 17 is pushed toward the top insulator 16 in the +Z direction, the base portion 18A of the inner contact 18 makes contact with the bottom surface of the recessed portion 13C of the plug contact 13, the bottom surface being situated at the +Z directional end of the recessed portion 13C.

Further, when the bottom insulator 17 is pushed toward the top insulator 16, the pair of projection contacting portions P1 of the inner contact 18 are relatively moved in the −Z direction with respect to the projection 17C from the first bottom surfaces 17G of the pair of first arm insertion grooves 17E to the second bottom surfaces 17H thereof through the inclined bottom surfaces 17J thereof while being elastically displaced in the X direction.

Furthermore, when the bottom insulator 17 is pushed toward the top insulator 16, the bosses 16C of the top insulator 16 sequentially pass through the notches 14B of the reinforcement sheet 14, the through-holes 15H of the sheet type conductive member 15, and the through-holes 17D of the bottom insulator 17. Then, the ends of the bosses 16C projecting on the −Z direction side of the bottom insulator 17 are thermally deformed, whereby the top insulator 16 and the bottom insulator 17 are fixed to each other. Thus, the assembling operation of the connector 11 is completed.

Note that the plug contacts 13 are fixed to the top insulator 16 and the bottom insulator 17 because their flanges 13B are sandwiched between the top insulator 16 and the bottom insulator 17.

Figure 19:
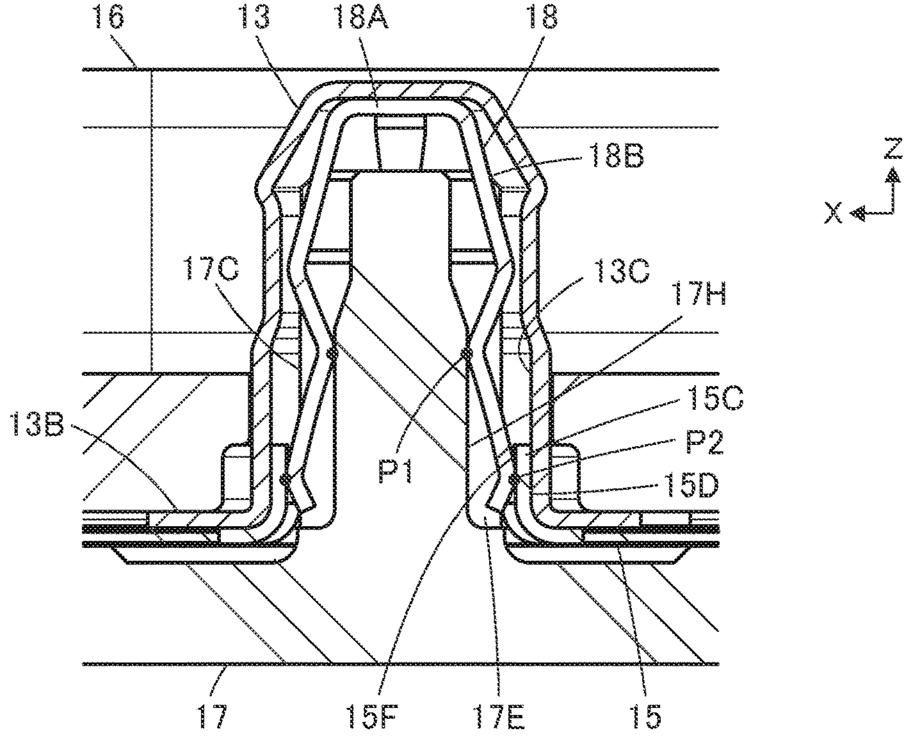
FIG. 19 is a partial cross-sectional side view showing the state of the interior of the plug contact in the connector of Embodiment 1 connected to the connection object, as viewed from the second direction.

In the connector 11 thus assembled, the pair of projection contacting portions P1 of the inner contact 18 make contact with the second bottom surfaces 17H of the pair of first arm insertion grooves 17E of the projection 17C as shown in FIG. 19, so that the distance between the pair of projection contacting portions P1 in the X direction is widened, and accordingly, elastic forces acting to widen the distance between the pair of pressing portions P2 in the X direction are exerted on the pair of pressing portions P2. Consequently, the pair of protruding portions 15C of the sheet type conductive member 15 sandwiched between the pair of pressing portions P2 of the inner contact 18 and the inner surface of the recessed portion 13C of the plug contact 13 are separately pressed against the inner surface of the recessed portion 13C of the plug contact 13.

Meanwhile, inside each opening 15B of the sheet type conductive member 15, the wiring layer 15D is exposed on the top surfaces, facing the +Z direction, of the pair of protruding portions 15C, and the wiring layer 15F is exposed on the bottom surfaces thereof facing the −Z direction, as shown in FIGS. 11 and 12.

Accordingly, the wiring layer 15D on the top surfaces of the protruding portions 15C make contact with the inner surface of the recessed portion 13C of the plug contact 13 at a predetermined contact pressure, while the wiring layer 15F on the bottom surfaces of the protruding portions 15C make contact with the pressing portions P2 of the inner contact 18 at a predetermined contact pressure.

Figure 20:
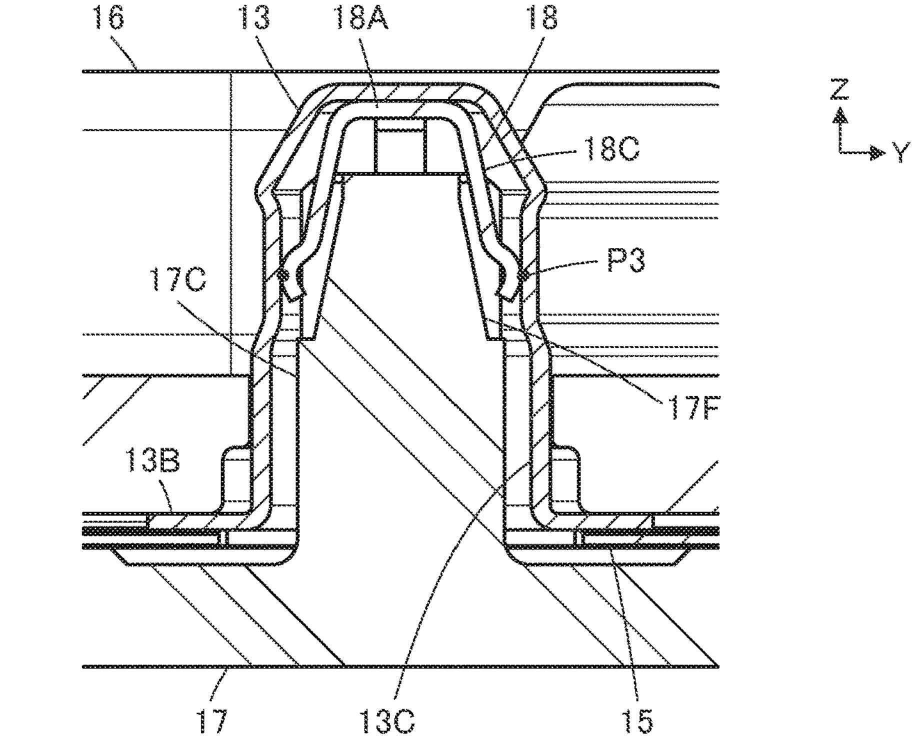
FIG. 20 is a partial cross-sectional side view showing the state of the interior of the plug contact in the connector of Embodiment 1 connected to the connection object, as viewed from the first direction.

Further, as shown in FIG. 20, the pair of contact portions P3 formed at the tip portions of the pair of second arm portions 18B of the inner contact 18 inserted in the recessed portion 13C of the plug contact 13 are pressed against the inner surface of the recessed portion 13C of the plug contact 13, whereby the inner contact 18 is electrically connected to the plug contact 13.

Consequently, the wiring layer 15D exposed on the top surfaces of the protruding portions 15C of the sheet type conductive member 15 are electrically connected to the plug contact 13 directly, while the wiring layer 15F exposed on the bottom surfaces of the protruding portions 15C of the sheet type conductive member 15 are electrically connected to the plug contact 13 via the inner contact 18. In other words, both the wiring layers 15D and 15F are connected to the plug contact 13.

Thus, with the connector 11, both the wiring layer 15D formed of a flexible conductor disposed on the top surface side of the sheet type conductive member 15 and the wiring layer 15F formed of a flexible conductor disposed on the bottom surface side of the same can be electrically connected to one plug contact 13 owing to the use of the inner contact 18.

Therefore, when the connector 11 is connected to a sheet type conductive member having a flexible conductor exposed only on the top surface side, the plug contact 13 can be electrically connected to the flexible conductor on the top surface side of the sheet type conductive member, and when the connector 11 is connected to a sheet type conductive member having a flexible conductor exposed only on the bottom surface side, the plug contact 13 can be electrically connected to the flexible conductor on the bottom surface side of the sheet type conductive member.

Further, when the connector 11 is connected to a sheet type conductive member having flexible conductors exposed on both the top and bottom surface sides like the sheet type conductive member 15 in Embodiment 1, the plug contact 13 can be electrically connected to both the flexible conductor on the top surface side of the sheet type conductive member and the flexible conductor on the bottom surface side thereof. For instance, in the case of using, as the connection object, a sheet type conductive member having a multilayer structure in which flexible conductors each constituting a shielding layer are exposed on both the top and bottom surface sides separately and another flexible conductor constituting a signal wiring layer is disposed between those shielding layers while being insulated from both of the shielding layers, when the plug contact 13 connected to the shielding layers on the top and bottom surface sides is connected to a ground potential, a shielding effect with respect to the signal wiring layer is demonstrated, and highly accurate signal transmission can be carried out with the influence of disturbance caused by electromagnetic waves and other factors being minimized.

The pair of protruding portions 15C of the sheet type conductive member 15 are not subjected to a large force from the inner contact 18 and not rubbed when inserted into the recessed portion 13C of the plug contact 13, and hence, the flexible conductors forming the wiring layers 15D and 15F of the sheet type conductive member 15 are prevented from being broken, thus ensuring the reliability of electric connection between the flexible conductors and the plug contact 13.

While the reinforcement sheet 14 is disposed between the bottom insulator 17 and the top insulator 16 in the connector 11 of Embodiment 1, the reinforcement sheet 14 may be omitted when it is not necessary to reinforce the mounting object such as a garment on which the connector 11 is to be mounted.

Embodiment 2

Figure 21:
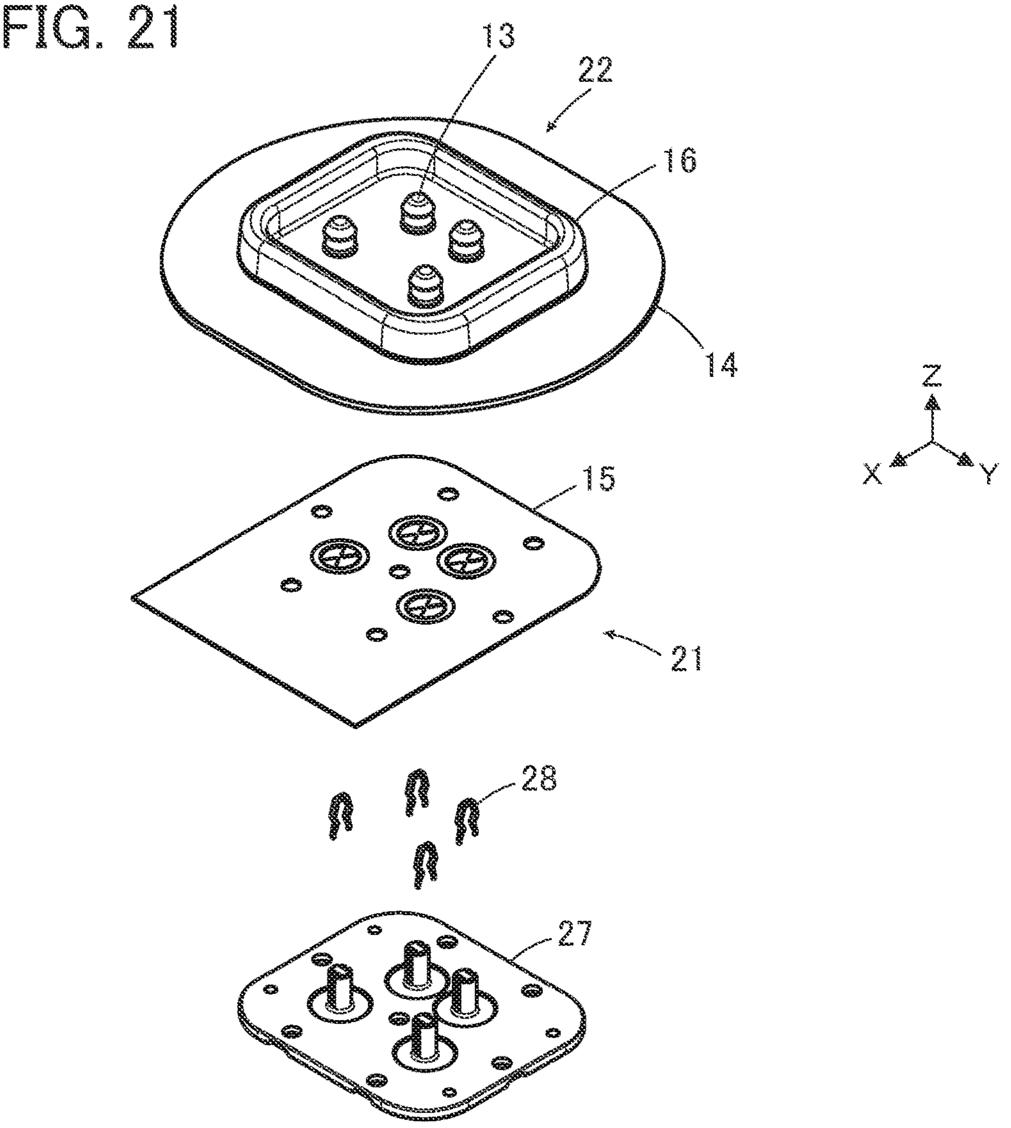
FIG. 21 is an assembly view of a connector according to Embodiment 2.

FIG. 21 shows an assembly view of a connector 21 according to Embodiment 2. The connector 21 is configured by, in the connector 11 of Embodiment 1, using a bottom insulator 27 in place of the bottom insulator 17 so that the top insulator 16 and the bottom insulator 27 constitute a housing 22 and also using four inner contacts 28 in place of the four inner contacts 18. The configuration other than the above is the same as that of the connector 11 of Embodiment 1.

Specifically, the four plug contacts 13 are retained in the top insulator 16, the reinforcement sheet 14 is disposed on the bottom surface of the top insulator 16 on the −Z direction side, and the sheet type conductive member 15 is disposed on the −Z direction side of the reinforcement sheet 14. Further, the four inner contacts 28 are disposed on the −Z direction side of the sheet type conductive member 15, and the bottom insulator 27 is disposed on the −Z direction side of the inner contacts 28.

Figure 22:
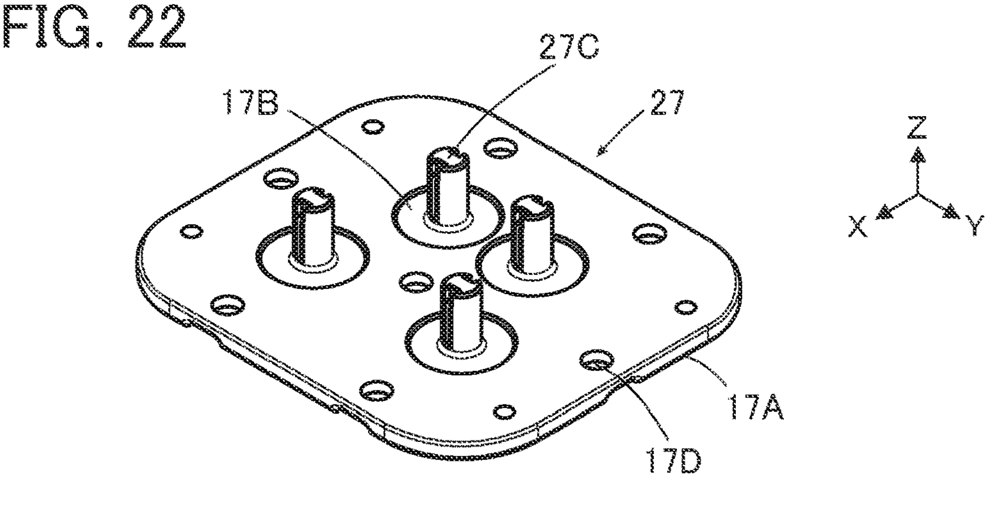
FIG. 22 is a perspective view showing a bottom insulator used in the connector of Embodiment 2.

As shown in FIG. 22, the bottom insulator 27 is configured such that four projections 27C are used in place of the four projections 17C in the bottom insulator 17 used in the connector 11 of Embodiment 1.

Specifically, the bottom insulator 27 includes the flat plate portion 17A, the flat plate portion 17A is provided with the four circular recessed portions 17B opening in the +Z direction, and the four projections 27C are formed to project in the +Z direction from central parts of the respective recessed portions 17B.

Figure 23:
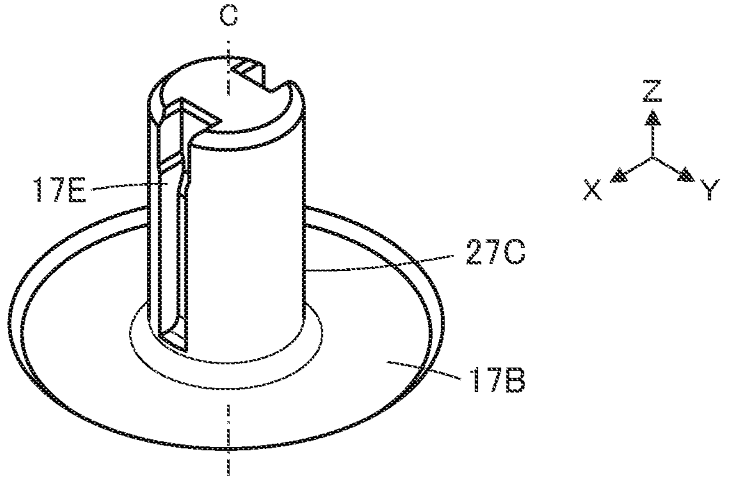
FIG. 23 is a perspective view showing a projection of the bottom insulator used in the connector of Embodiment 2.

As shown in FIG. 23, the projection 27C of the bottom insulator 27 has the shape of a circular column extending in the Z direction along the fitting axis C of the plug contact 13 situated to correspond to the recessed portion 17B. The first arm insertion grooves 17E extending in the Z direction are formed at the lateral surface of the projection 27C separately on the opposite sides in the X direction. Those first arm insertion grooves 17E are the same as the first arm insertion grooves 17E of the projection 17C in Embodiment 1. No grooves are formed at the lateral surface of the projection 27C on the opposite sides in the Y direction.

Figure 24:
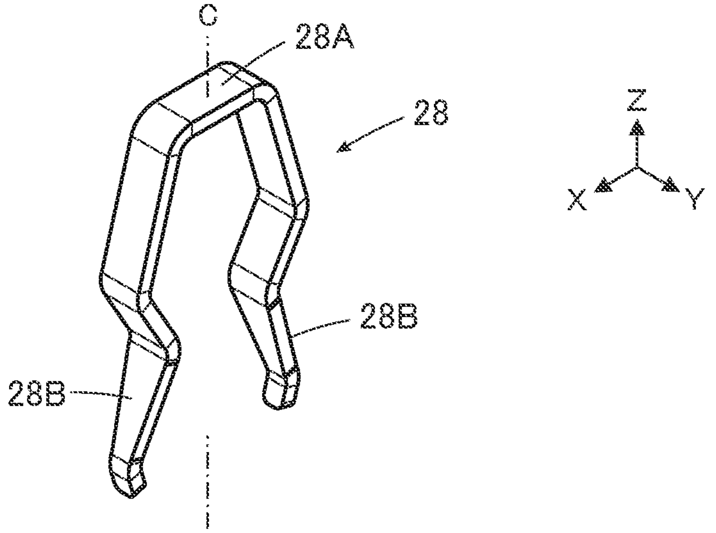
FIG. 24 is a perspective view showing an inner contact used in the connector of Embodiment 2.

FIG. 24 shows the structure of the inner contact 28. The inner contact 28 is formed of a plate member made of a conductive material such as metal and bent, and includes a base portion 28A situated on the fitting axis C and extending in an XY plane, and a pair of first arm portions 28B extending in the −Z direction separately from the +X directional end and the −X directional end of the base portion 28A.

Figure 25:
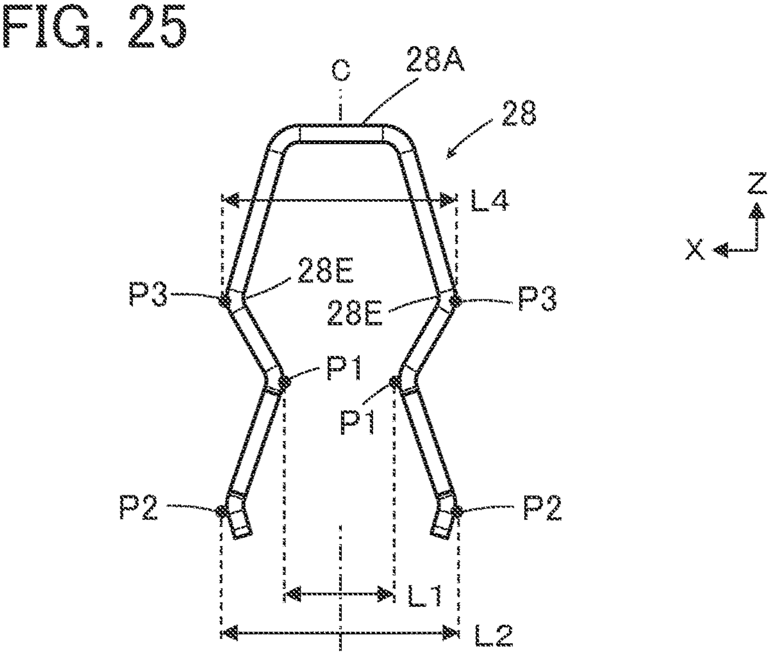
FIG. 25 is a side view of the inner contact used in the connector of Embodiment 2, as viewed from the second direction.

As shown in FIG. 25, the pair of first arm portions 28B face each other in the X direction and have a symmetrical shape with respect to a YZ plane passing the fitting axis C.

The pair of first arm portions 28B have a pair of projection contacting portions P1 that are formed in the intermediate portions in the Z direction and are elastically displaceable in the X direction and a pair of pressing portions P2 that are formed in the −Z directional tip portions and are elastically displaceable in the X direction, as with the pair of first arm portions 18B of the inner contact 18 in Embodiment 1.

The pair of first arm portions 28B further have a pair of second bending portions 28E bent to project in the opposite directions from each other along the X direction, each second bending portion 28E being situated between a joint portion at which the first arm portion 28B and the base portion 28A are joined together and the projection contacting portion P1. Projecting surfaces of the pair of second bending portions 28E that face the opposite directions from each other form a pair of contact portions P3 elastically displaceable in the X direction perpendicular to the fitting axis C.

With no external force acting on the inner contact 28, a distance L4 between the pair of contact portions P3 in the X direction has a dimension substantially equal to or slightly smaller than the inner diameter of the recessed portion 13C of the plug contact 13.

When the connector 21 is assembled, first, each inner contact 28 is temporarily retained on the corresponding projection 27C of the bottom insulator 27. The inner contact 28 is temporarily retained on the projection 27C with the pair of first arm portions 28B being inserted in the pair of first arm insertion grooves 17E of the projection 27C.

Next, the bosses 16C of the top insulator 16 are inserted into the notches 14B of the reinforcement sheet 14. Further, the tubular portions 13A of the plug contacts 13 are correspondingly inserted into the four contact through-holes 16B of the top insulator 16 from the −Z direction, and the sheet type conductive member 15 is disposed on the −Z direction side of the four plug contacts 13 such that each opening 15B and each pair of protruding portions 15C of the sheet type conductive member 15 are positioned at an opening end portion of the recessed portion 13C of the corresponding tubular portion 13A.

Figure 26:
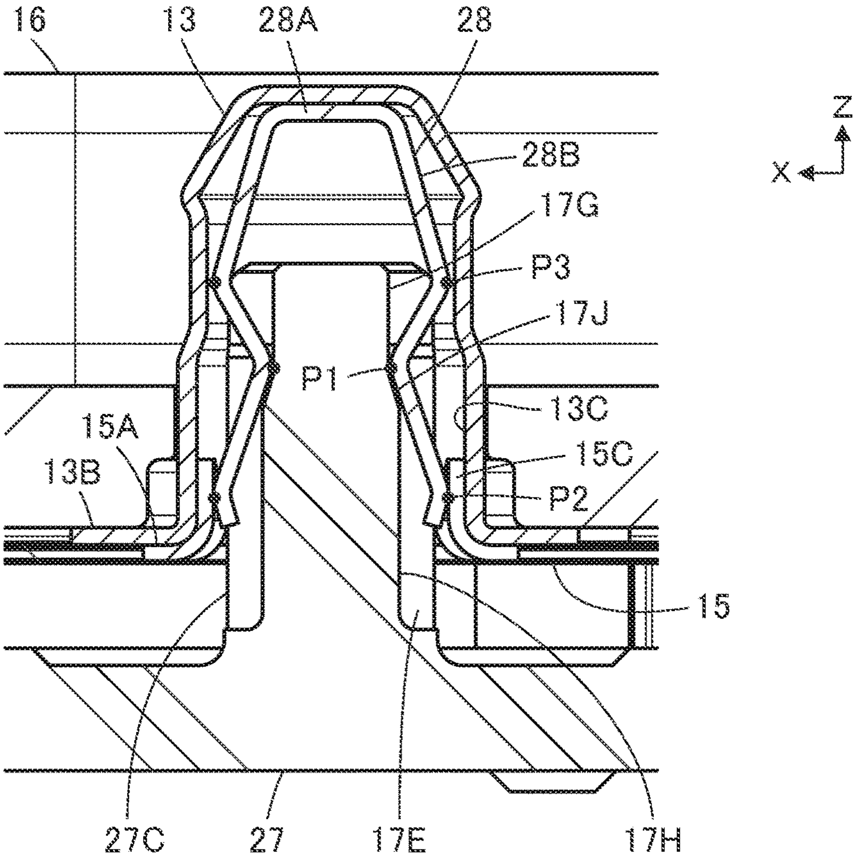
FIG. 26 is a partial cross-sectional side view showing the state of the interior of the plug contact in the connector of Embodiment 2 during the assembling operation, as viewed from the second direction.

In this state, the bottom insulator 27 is pushed toward the top insulator 16 in the +Z direction with the sheet type conductive member 15 being sandwiched therebetween. At this time, as shown in FIG. 26, the flange 13B of each plug contact 13 is situated above the corresponding contact arrangement region 15A of the sheet type conductive member 15, and each inner contact 28 temporarily retained on the bottom insulator 27 is inserted into the recessed portion 13C of the corresponding plug contact 13 while pushing the corresponding pair of protruding portions 15C of the sheet type conductive member 15.

Consequently, the pair of protruding portions 15C of the sheet type conductive member 15 pushed into the recessed portion 13C of the plug contact 13 are sandwiched between the pair of pressing portions P2 formed at the −Z directional end portions of the pair of first arm portions 28B of the inner contact 28 and the inner surface of the recessed portion 13C of the plug contact 13.

However, with no external force acting on the inner contact 28, the pair of pressing portions P2 have a distance therebetween in the X direction that is substantially equal to or slightly smaller than a value obtained by subtracting a double of the thickness of the sheet type conductive member 15 from the inner diameter of the recessed portion 13C of the plug contact 13 as with Embodiment 1; therefore, the pair of protruding portions 15C of the sheet type conductive member 15 are smoothly inserted into the recessed portion 13C of the plug contact 13 without being subjected to a large force from the inner contact 28 and being rubbed.

The pair of projection contacting portions P1 of the inner contact 28 are in contact with the first bottom surfaces 17G of the pair of first arm insertion grooves 17E of the projection 27C, and when the bottom insulator 27 is pushed toward the top insulator 16 in the +Z direction, the base portion 28A of the inner contact 28 makes contact with the bottom surface, situated at the +Z directional end, of the recessed portion 13C of the plug contact 13.

Further, when the bottom insulator 27 is pushed toward the top insulator 16, the pair of projection contacting portions P1 of the inner contact 28 are relatively moved in the −Z direction with respect to the projection 27C from the first bottom surfaces 17G of the pair of first arm insertion grooves 17E to the second bottom surfaces 17H thereof through the inclined bottom surfaces 17J thereof while being elastically displaced in the X direction.

Furthermore, when the bottom insulator 27 is pushed toward the top insulator 16, the bosses 16C of the top insulator 16 sequentially pass through the notches 14B of the reinforcement sheet 14, the through-holes 15H of the sheet type conductive member 15, and the through-holes 17D of the bottom insulator 27. Then, the ends of the bosses 16C projecting on the −Z direction side of the bottom insulator 27 are thermally deformed, whereby the top insulator 16 and the bottom insulator 27 are fixed to each other. Thus, the assembling operation of the connector 11 is completed.

Figure 27:
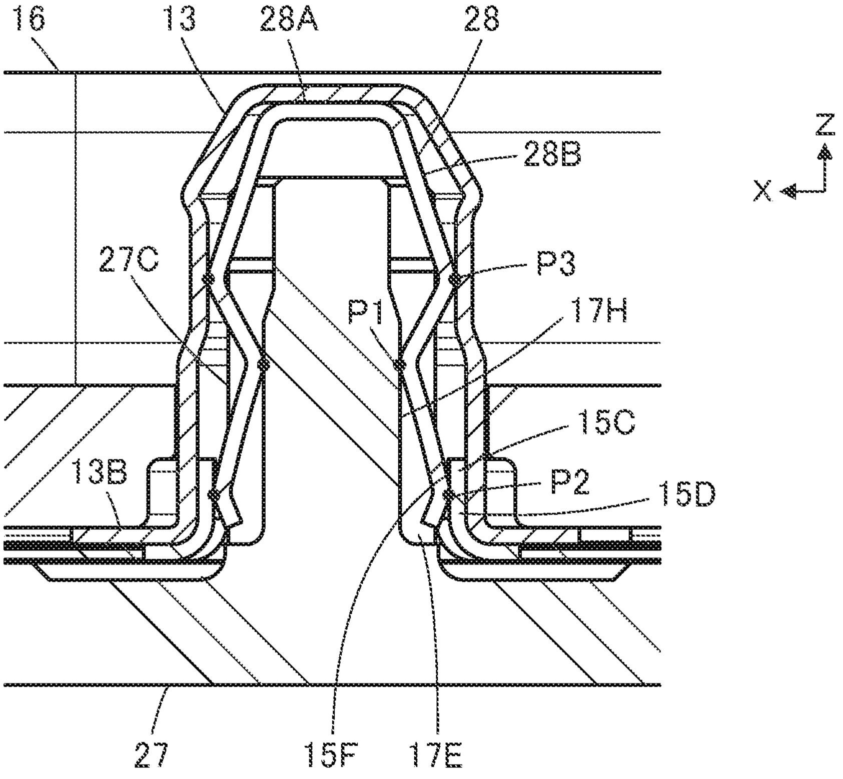
FIG. 27 is a partial cross-sectional side view showing the state of the interior of the plug contact in the connector of Embodiment 2 connected to the connection object, as viewed from the second direction.

In the connector 21 thus assembled, the pair of projection contacting portions P1 of the inner contact 28 make contact with the second bottom surfaces 17H of the pair of first arm insertion grooves 17E of the projection 27C as shown in FIG. 27, so that the distance between the pair of projection contacting portions P1 in the X direction is widened, and accordingly, elastic forces act on the pair of pressing portions P2 to widen the distance between the pair of pressing portions P2 in the X direction. Consequently, the pair of protruding portions 15C of the sheet type conductive member 15 sandwiched between the pair of pressing portions P2 of the inner contact 28 and the inner surface of the recessed portion 13C of the plug contact 13 are separately pressed against the inner surface of the recessed portion 13C of the plug contact 13.

Accordingly, the wiring layer 15D on the top surfaces of the protruding portions 15C makes contact with the inner surface of the recessed portion 13C of the plug contact 13 at a predetermined contact pressure, while the wiring layer 15F on the bottom surfaces of the protruding portions 15C makes contact with the pressing portions P2 of the inner contact 28 at a predetermined contact pressure.

In addition, as the distance between the pair of projection contacting portions P1 of the inner contact 28 in the X direction is widened, elastic forces acting to widen the distance between the pair of contact portions P3 of the pair of first arm portions 28B in the X direction are exerted on the pair of contact portions P3, each contact portion P3 being formed between the joint portion at which the first arm portion 28B and the base portion 28A are joined together and the projection contacting portion P1. Thus, the pair of contact portions P3 are pressed against the inner surface of the recessed portion 13C of the plug contact 13, whereby the inner contact 28 is electrically connected to the plug contact 13.

Consequently, the wiring layer 15D exposed on the top surfaces of the protruding portions 15C of the sheet type conductive member 15 are electrically connected to the plug contact 13 directly, while the wiring layer 15F exposed on the bottom surfaces of the protruding portions 15C of the sheet type conductive member 15 are electrically connected to the plug contact 13 via the inner contact 28. In other words, both the wiring layers 15D and 15F are connected to the plug contact 13.

Thus, also in the connector 21, both the wiring layer 15D formed of a flexible conductor disposed on the top surface side of the sheet type conductive member 15 and the wiring layer 15F formed of a flexible conductor disposed on the bottom surface side of the same can be electrically connected to one plug contact 13 owing to the use of the inner contact 28.

Therefore, when the connector 21 is connected to a sheet type conductive member having a flexible conductor exposed only on the top surface side, the plug contact 13 can be electrically connected to the flexible conductor on the top surface side of the sheet type conductive member, and when the connector 21 is connected to a sheet type conductive member having a flexible conductor exposed only on the bottom surface side, the plug contact 13 can be electrically connected to the flexible conductor on the bottom surface side of the sheet type conductive member, as with Embodiment 1.

The pair of protruding portions 15C of the sheet type conductive member 15 are not subjected to a large force from the inner contact 28 and not rubbed when inserted into the recessed portion 13C of the plug contact 13, and hence, the flexible conductors forming the wiring layers 15D and 15F of the sheet type conductive member 15 are prevented from being broken, thus ensuring the reliability of electric connection between the flexible conductors and the plug contact 13.

Embodiment 3

Figure 28:
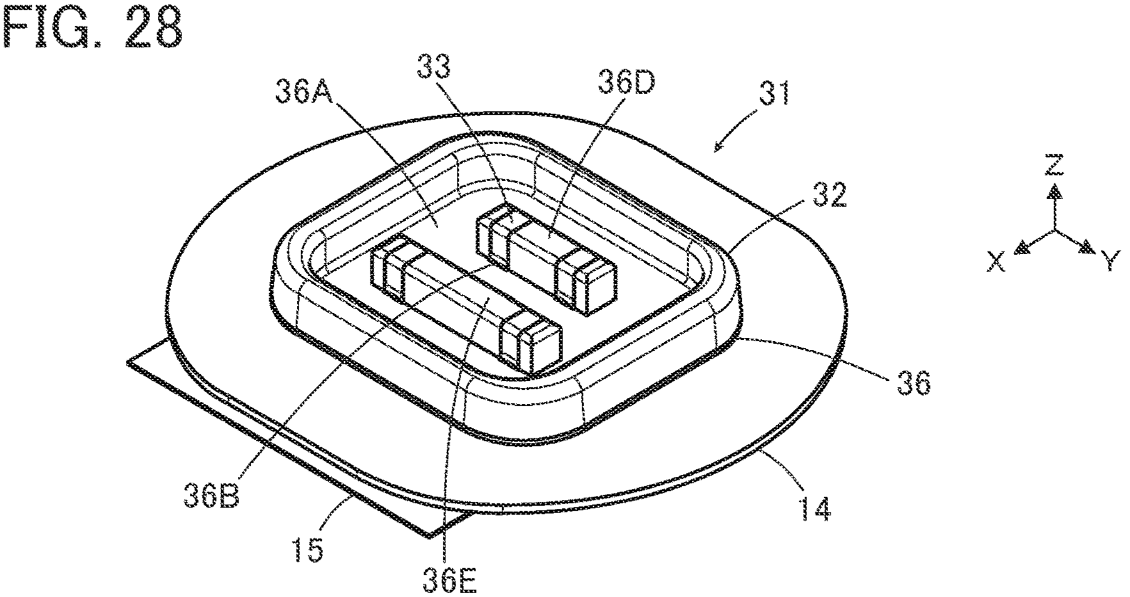
FIG. 28 is a perspective view showing a connector according to Embodiment 3.

FIG. 28 shows a connector 31 according to Embodiment 3. The connector 31 is configured by, in the connector 21 of Embodiment 2, using a top insulator 36 in place of the top insulator 16 so that the top insulator 36 and the bottom insulator 27 constitute a housing 32 and also using four plug contacts 33 in place of the four plug contacts 13. The configuration other than the above is the same as that of the connector 21 of Embodiment 2.

The four plug contacts 33 are retained in the top insulator 36. The top insulator 36 includes a recessed portion 36A opening in the +Z direction as with the top insulator 16 shown in FIG. 3. Two jutting portions 36D and 36E jutting in the +Z direction are formed within the recessed portion 36A. The jutting portions 36D and 36E are situated at a distance in the X direction and each extend in the Y direction. Each of the jutting portions 36D and 36E is provided with two contact through-holes 36B penetrating the top insulator 36 in the Z direction, and the corresponding plug contacts 33 are exposed toward the +Z direction through the contact through-holes 36B.

It should be noted that the bosses 16C projecting in the −Z direction are formed on a surface, facing the −Z direction, of the top insulator 36, as with the top insulator 16 shown in FIG. 3.

Figure 29:
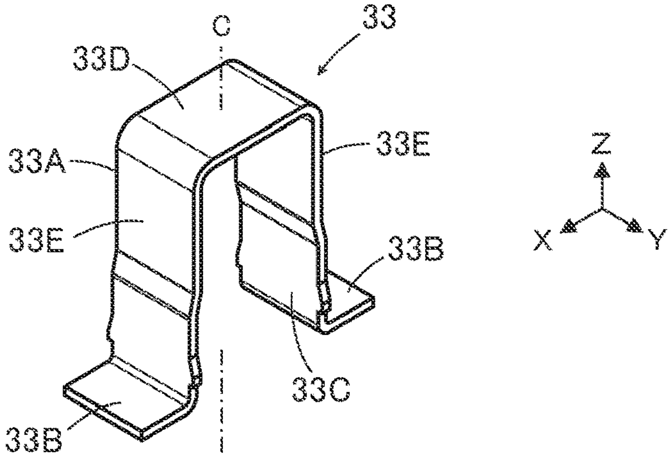
FIG. 29 is a perspective view showing a plug contact used in the connector of Embodiment 3.
Figure 30:
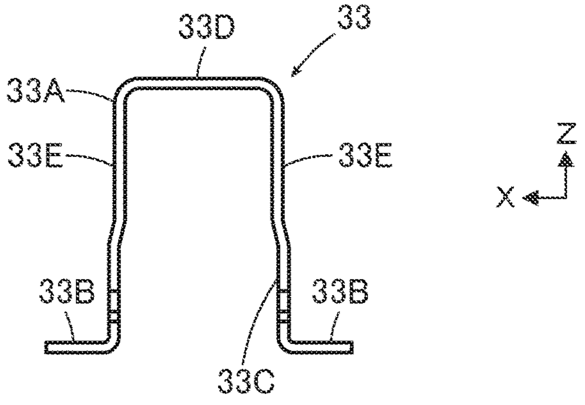
FIG. 30 is a side view showing the plug contact used in the connector of Embodiment 3.

The structure of the plug contact 33 is shown in FIGS. 29 and 30. The plug contact 33 is formed from a bent metal plate and includes a protrusion portion formed of a U-shaped portion 33A protruding in the +Z direction along the fitting axis C. The U-shaped portion 33A is composed of a top plate portion 33D extending along an XY plane and a pair of lateral plate portions 33E extending in the −Z direction along a YZ plane separately from the +X directional end and the −X directional end of the top plate portion 33D. The plug contact 33 further includes a pair of flanges 33B of flat plate shape extending in the opposite directions from each other along an XY plane separately from the −Z directional ends of the pair of lateral plate portions 33E.

The interior of the U-shaped portion 33A forms a recessed portion 33C.

Even with the use of the top insulator 36 and the four plug contacts 33 as above, the connector 31 can be assembled in the same manner as in Embodiment 2.

Specifically, the inner contacts 28 as shown in FIGS. 24 and 25 are temporarily retained on the corresponding projections 27C of the bottom insulator 27, the U-shaped portions 33A of the plug contacts 33 are correspondingly inserted into the four contact through-holes 36B of the top insulator 36 from the −Z direction, and the sheet type conductive member 15 is disposed on the −Z direction side of the four plug contacts 33 such that each opening 15B and each pair of protruding portions 15C of the sheet type conductive member 15 are positioned at an opening end portion of the recessed portion 33C of the corresponding U-shaped portion 33A.

Figure 31:
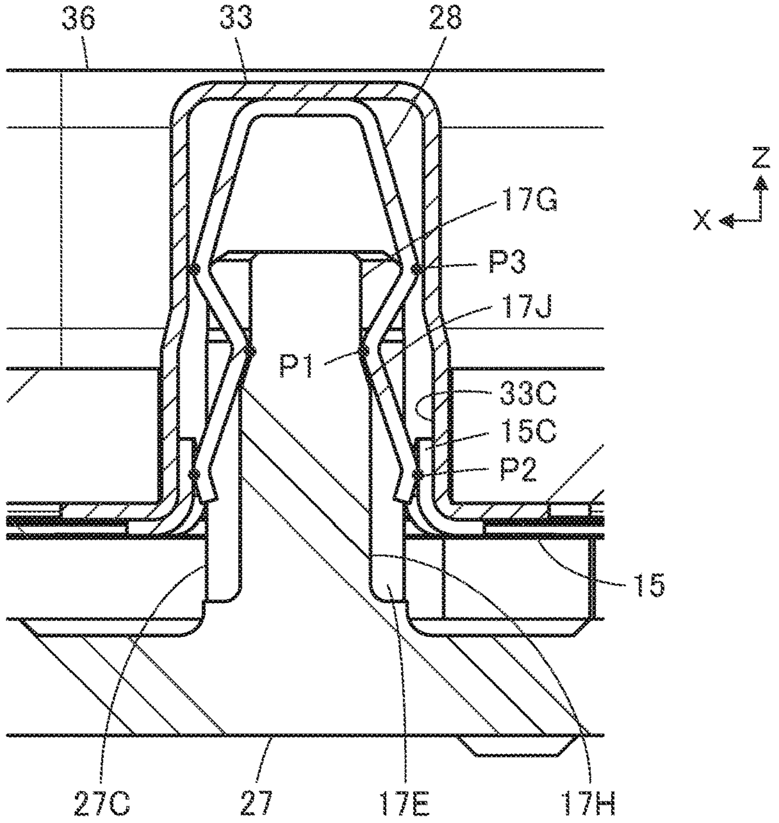
FIG. 31 is a partial cross-sectional side view showing the state of the interior of the plug contact in the connector of Embodiment 3 during the assembling operation, as viewed from the second direction.

In this state, the bottom insulator 27 is pushed toward the top insulator 36 in the +Z direction with the sheet type conductive member 15 being sandwiched therebetween. As a consequence, as shown in FIG. 31, each inner contact 28 temporarily retained on the bottom insulator 27 is inserted into the recessed portion 33C of the corresponding plug contact 33 while pushing the corresponding pair of protruding portions 15C of the sheet type conductive member 15.

The pair of protruding portions 15C of the sheet type conductive member 15 pushed into the recessed portion 33C of the plug contact 33 are sandwiched between the pair of pressing portions P2 of the inner contact 28 and the inner surface of the recessed portion 33C of the plug contact 33.

It is assumed that with no external force acting on the inner contact 28, the distance between the pair of contact portions P3 in the X direction has a dimension substantially equal to or slightly smaller than a distance between the inner surfaces of the recessed portion 33C of the plug contact 33 in the X direction.

Accordingly, the pair of protruding portions 15C of the sheet type conductive member 15 are smoothly inserted into the recessed portion 33C of the plug contact 33 without being subjected to a large force from the inner contact 28 and being rubbed.

Further, when the bottom insulator 27 is pushed toward the top insulator 36, the pair of projection contacting portions P1 of the inner contact 28 are relatively moved in the −Z direction with respect to the projection 27C from the first bottom surfaces 17G of the pair of first arm insertion grooves 17E of the projection 27C to the second bottom surfaces 17H thereof through the inclined bottom surfaces 17J thereof while being elastically displaced in the X direction.

The ends of the bosses 16C of the top insulator 36 projecting on the −Z direction side of the bottom insulator 27 are thermally deformed, whereby the top insulator 36 and the bottom insulator 27 are fixed to each other. Thus, the assembling operation of the connector 31 is completed.

Figure 32:
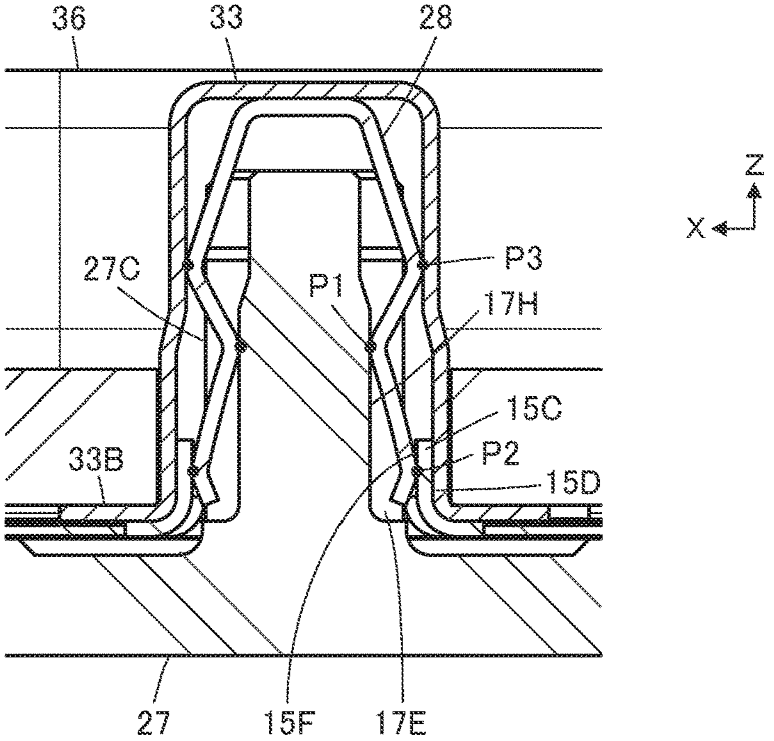
FIG. 32 is a partial cross-sectional side view showing the state of the interior of the plug contact in the connector of Embodiment 3 connected to the connection object, as viewed from the second direction.
Figure 33:
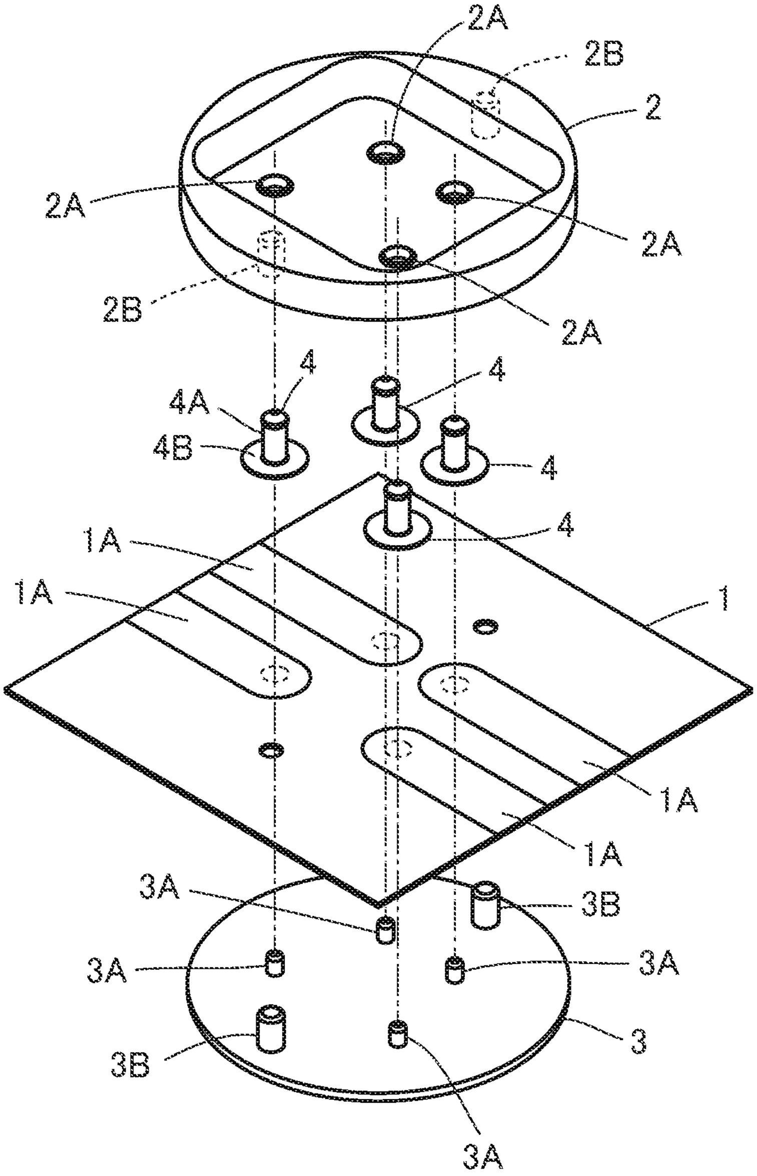
FIG. 33 PRIOR ART
FIG. 33 is an exploded perspective view of a conventional connector.
Figure 34:
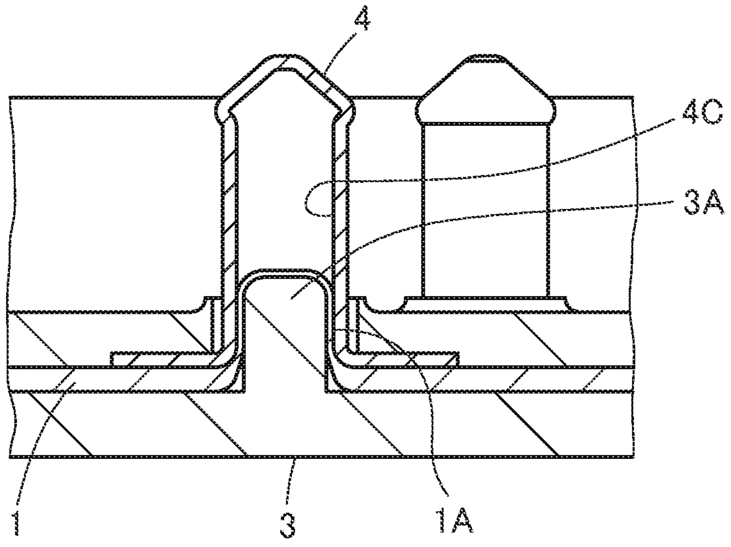
FIG. 34 PRIOR ART
FIG. 34 is a partial cross-sectional view showing the conventional connector.

Also in the connector 31 thus assembled, as with the connector 21 of Embodiment 2, the pair of projection contacting portions P1 of the inner contact 28 make contact with the second bottom surfaces 17H of the pair of first arm insertion grooves 17E of the projection 27C as shown in FIG. 32, so that the distance between the pair of projection contacting portions P1 in the X direction is widened. Accordingly, elastic forces acting to widen the distance between the pair of pressing portions P2 in the X direction are exerted on the pair of pressing portions P2, and the pair of protruding portions 15C of the sheet type conductive member 15 are separately pressed against the inner surface of the recessed portion 33C of the plug contact 33.

Thus, the wiring layer 15D on the top surfaces of the protruding portions 15C makes contact with the inner surface of the recessed portion 33C of the plug contact 33 at a predetermined contact pressure, while the wiring layer 15F on the bottom surfaces of the protruding portions 15C makes contact with the pressing portions P2 of the inner contact 28 at a predetermined contact pressure.

In addition, the pair of contact portions P3 of the inner contact 28 are pressed against the inner surface of the recessed portion 33C of the plug contact 33, whereby the inner contact 28 is electrically connected to the plug contact 33.

Consequently, the wiring layer 15D exposed on the top surfaces of the protruding portions 15C of the sheet type conductive member 15 are electrically connected to the plug contact 33 directly, while the wiring layer 15F exposed on the bottom surfaces of the protruding portions 15C of the sheet type conductive member 15 are electrically connected to the plug contact 33 via the inner contact 28. In other words, both the wiring layers 15D and 15F are connected to the plug contact 33.

Thus, also in the connector 31, both the wiring layer 15D formed of a flexible conductor disposed on the top surface side of the sheet type conductive member 15 and the wiring layer 15F formed of a flexible conductor disposed on the bottom surface side of the same can be electrically connected to one plug contact 33.

Therefore, when the connector 31 is connected to a sheet type conductive member having a flexible conductor exposed only on the top surface side, the plug contact 33 can be electrically connected to the flexible conductor on the top surface side of the sheet type conductive member, and when the connector 31 is connected to a sheet type conductive member having a flexible conductor exposed only on the bottom surface side, the plug contact 33 can be electrically connected to the flexible conductor on the bottom surface side of the sheet type conductive member, as with Embodiments 1 and 2.

The pair of protruding portions 15C of the sheet type conductive member 15 are not subjected to a large force from the inner contact 28 and not rubbed when inserted into the recessed portion 33C of the plug contact 33, and hence, the flexible conductors forming the wiring layers 15D and 15F of the sheet type conductive member 15 are prevented from being broken, thus ensuring the reliability of electric connection between the flexible conductors and the plug contact 33.

In Embodiments 1 to 3 above, the plug contact 13, 33 disposed in the contact arrangement region 15A of the sheet type conductive member 15 makes contact with both the wiring layer 15D exposed on the top surface side of the sheet type conductive member 15 and the wiring layer 15F exposed on the bottom surface side of the sheet type conductive member 15; however, for instance, it is also possible to connect only the wiring layer 15D exposed on the bottom surface side of the sheet type conductive member 15 to the plug contact 13, 33 disposed in the contact arrangement region 15A.

While the sheet type conductive member 15 used in Embodiments 1 to 3 above has a multilayer structure, the invention is not limited thereto, and it is sufficient that a conductive member has a flexible conductor exposed on at least one surface of the conductive member.

While the two layers of flexible conductors, namely, the wiring layer 15D and the wiring layer 15F, of the sheet type conductive member 15 are connected to one plug contact 13, 33 in Embodiments 1 to 3 above, the invention is not limited thereto, and three or more layers of flexible conductors can be connected to one plug contact 13, 33.

While the connector 11, 21, 31 according to Embodiments 1 to 3 above has four plug contacts 13, 33, the number of the plug contacts 13, 33 is not limited, and it is sufficient that there is provided one plug contact 13, 33 electrically connected to a flexible conductor exposed on at least one surface of the sheet type conductive member 15.

What is claimed is:

1. A connector comprising:
- a plug contact having a conductive property and including a recessed portion extending along a fitting axis;
- an inner contact having a conductive property and inserted in the recessed portion; and
- a bottom insulator including a projection extending along the fitting axis and inserted in the recessed portion,
- wherein the inner contact includes
- a contact portion that is elastically displaceable in a direction perpendicular to the fitting axis and makes contact with the plug contact in the recessed portion,
- a projection contacting portion that is elastically displaceable in a direction perpendicular to the fitting axis and makes contact with a lateral surface of the projection in the recessed portion,
- a pressing portion that is elastically displaceable in a direction perpendicular to the fitting axis and faces an inner surface of the recessed portion, and
- a part of a connection object of sheet shape having a flexible conductor exposed on at least one surface of the connection object is sandwiched between the pressing portion and the inner surface of the recessed portion in a direction perpendicular to the fitting axis, the inner surface of the recessed portion makes contact with a top surface of the connection object, and the pressing portion makes contact with a bottom surface of the connection object, whereby the plug contact is electrically connected to the flexible conductor directly when the flexible conductor is exposed on the top surface of the connection object, and the plug contact is electrically connected to the flexible conductor via the inner contact when the flexible conductor is exposed on the bottom surface of the connection object,
- wherein the inner contact includes: a base portion facing a bottom surface of the recessed portion within the recessed portion; and a pair of first arm portions that extend in a direction along at least the fitting axis separately from opposite ends of the base portion in a first direction perpendicular to the fitting axis and face each other in the first direction, and wherein the projection contacting portion is disposed at each of intermediate portions of the pair of first arm portions, and the pressing portion is disposed at each of tip portions of the pair of first arm portions.

2. The connector according to claim 1, wherein the intermediate portions of the pair of first arm portions have a pair of first bending portions each bent to project in the first direction, each of projecting surfaces of the pair of first bending portions that face each other forms the projection contacting portion, and the pressing portions disposed at the tip portions of the pair of first arm portions face opposite directions from each other along the first direction.

3. The connector according to claim 1, wherein the inner contact includes a pair of second arm portions that extend in a direction along at least the fitting axis separately from opposite ends of the base portion in a second direction perpendicular to the fitting axis and also perpendicular to the first direction and that face each other in the second direction, and the contact portion is disposed at each of tip portions of the pair of second arm portions.

4. The connector according to claim 3, wherein the contact portions disposed at the tip portions of the pair of second arm portions face opposite directions from each other along the second direction.

5. The connector according to claim 1, wherein the contact portion is disposed between a joint portion at which each of the pair of first arm portions and the base portion are joined together and an associated one of the intermediate portions.

6. The connector according to claim 5, wherein the pair of first arm portions include a pair of second bending portions that are each situated between the joint portion at which each of the pair of first arm portions and the base portion are joined together and an associated one of the intermediate portions and that are bent to project in opposite directions from each other along the first direction, and each of projecting surfaces of the pair of second bending portions that face opposite directions from each other forms the contact portion.

7. The connector according to claim 1, wherein the projection includes a pair of first arm insertion grooves which extend along the fitting axis at the lateral surface of the projection on opposite sides in the first direction and in which the pair of first arm portions are inserted, and when the projection contacting portions of the pair of first arm portions make contact with bottom surfaces of the pair of first arm insertion grooves, the pressing portions connected to the projection contacting portions are pressed against the inner surface of the recessed portion.

8. The connector according to claim 3, wherein the projection includes a pair of second arm insertion grooves which extend along the fitting axis at the lateral surface of the projection on opposite sides in the second direction and in which the pair of second arm portions are inserted.

9. The connector according to claim 1, wherein the plug contact includes: a protrusion portion protruding along the fitting axis; and a flange extending from a base end of the protrusion portion in a direction perpendicular to the fitting axis, and the recessed portion is constituted of an interior of the protrusion portion.

10. The connector according to claim 9, wherein the plug contact includes: the protrusion portion constituted of a tubular portion; and the flange in a discoid shape extending in a radial direction from an outer periphery of the base end of the tubular portion.

11. The connector according to claim 9, wherein the plug contact includes: the protrusion portion constituted of a U-shaped portion; and the flange comprising a pair of flat plate flanges extending from opposite ends of the U-shaped portion in opposite directions from each other.

12. The connector according to claim 9, comprising a housing having an insulating property and configured to retain the connection object, the plug contact, and the inner contact, wherein the housing includes:

a top insulator provided with a contact through-hole through which the protrusion portion of the plug contact is passed; and the bottom insulator, and the top insulator is fixed to the bottom insulator such that the protrusion portion of the plug contact is passed through the contact through-hole and the connection object and the flange are sandwiched between the top insulator and the bottom insulator.

13. A connecting method for connecting the plug contact to the flexible conductor of the connection object by use of the connector according to claim 1, the method comprising:

disposing the connection object with respect to the plug contact such that the flexible conductor exposed on at least one surface of the connection object is positioned at an opening end portion of the recessed portion of the plug contact;

inserting the inner contact into the recessed portion while pushing the connection object into the recessed portion such that the contact portion of the inner contact makes contact with the plug contact within the recessed portion and that the connection object is sandwiched between the pressing portion of the inner contact and the inner surface of the recessed portion in a direction perpendicular to the fitting axis; and inserting the projection of the bottom insulator into the recessed portion such that the lateral surface of the projection makes contact with the projection contacting portion of the inner contact, whereupon the inner surface of the recessed portion makes contact with the top surface of the connection object, and the pressing portion makes contact with the bottom surface of the connection object, whereby the plug contact is electrically connected to the flexible conductor directly when the flexible conductor is exposed on the top surface of the connection object, and the plug contact is electrically connected to the flexible conductor via the inner contact when the flexible conductor is exposed on the bottom surface of the connection object.

* * * * *